United States Patent [19]

Tanaka

[11] Patent Number: 4,582,419

[45] Date of Patent: Apr. 15, 1986

[54] COPYING MACHINE

[75] Inventor: Kenzo Tanaka, Toyokawa, Japan

[73] Assignee: Minolta Camera Kabushiki Kaisha, Osaka, Japan

[21] Appl. No.: 654,380

[22] Filed: Sep. 25, 1984

[30] Foreign Application Priority Data

Sep. 26, 1983 [JP] Japan ............................... 58-178751

Oct. 3, 1983 [JP] Japan ............................... 58-185457

[51] Int. Cl.$^{4}$ .............................................. G03B 27/52

[52] U.S. Cl. ........................................ 355/55; 355/60; 355/61

[58] Field of Search ....................... 355/55, 56, 57, 58, 355/59, 60, 61

[56] References Cited

U.S. PATENT DOCUMENTS 4,250,554 2/1981 Blum et al. ............................ 355/61

4,514,080 4/1985 Matsuzawa et al. .................. 355/55

*Primary Examiner*—Monroe H. Hayes

*Attorney, Agent, or Firm*—Price, Gess & Ubell

[57] ABSTRACT

A copying machine provided with data storing means for storing a plurality of designated magnification ratios and a plurality of hidden magnification ratios, a first key for selecting a desired magnification mode such as designated magnification mode or hidden magnification mode and a plurality of second keys for selecting magnification ratios from the data stored in the data storing means so that various kinds of magnification ratios can be easily selected with a simple operation of the decreased number of keys.

7 Claims, 25 Drawing Figures

COPYING MACHINE

FIELD OF THE INVENTION

The present invention relates to a copying machine, and more particularly to a magnification control device for use in an electrophotographic copying machine.

BACKGROUND OF THE INVENTION

In a conventional copying machine in which copying magnification can be changed, and of such a type that keys are provided for each of the predetermined copying magnifications, there must be provided a number of key switches with a complicated circuit arrangement, thereby causing an increase in the production cost of the copying machine. Another type of machine exists, wherein only one key is provided so that the copying magnification can be changed from one magnification ratio to another magnification ratio step by step each time said key is operated, and the desired magnification ratio can be set by ceasing the operation of the key. Upon operation of the key by a predetermined number of times, the magnification ratio can return to an original value. In this type or machine, the key must be operated a number of times, the operation of the key is troublesome. Another disadvantage of the conventional copying machine is that in a case where the original to be copied has an irregular paper size, the most suitable magnification ratio can not be designated. Even if the copying magnification ratio can be set as a desired value for the irregular size original, it is necessary to memorize the magnification ratio which is once set, and updating the past memorized magnification ratio, whereby the magnification ratio set previously are not available once a new magnification ratio is set in the copying machine.

SUMMARY OF THE INVENTION

The present invention provides a copying magnification control device for use in a copying machine which is able to readily set the copying magnification ratio and to enable a magnified copy with a temporarily set magnification ratio.

Another object of the present invention is to provide a copying magnification control device which enables the selection of a magnification ratio from various kinds of magnification ratios as desired with a decreased number of operation keys.

A further object of the present invention is to provide a copying magnification control device which enables an operator to easily set various kinds of magnification ratios such as designated magnification ratios and hidden magnification ratios with a decreased number of operation keys.

A still further object of the present invention is to provide a copying machine which can make a copy or copies with an a precisely controlled magnification with easy operation.

According to the present invention, there is provided a magnification control device for use in a copying machine which comprises numeric data input means first data storing means for storing the data entered by the data input means, second data storing means for storing a plurality of copy magnification ratios, selecting means for selecting one of the copying magnification ratios from the second data storing means, third data storing means for storing magnification ratio data for a copy, operating means for executing the copy in said copying machine, and control means for causing the data entered by the data input means or the data selected by the selecting means to be stored in said third data storing means upon operation of said operating means under such states that the data is selected by the selecting means or the data is stored in the first data storing means.

DETAILED DESCRIPTION OF THE PREFERRED EMBODIMENTS

Figure 1:
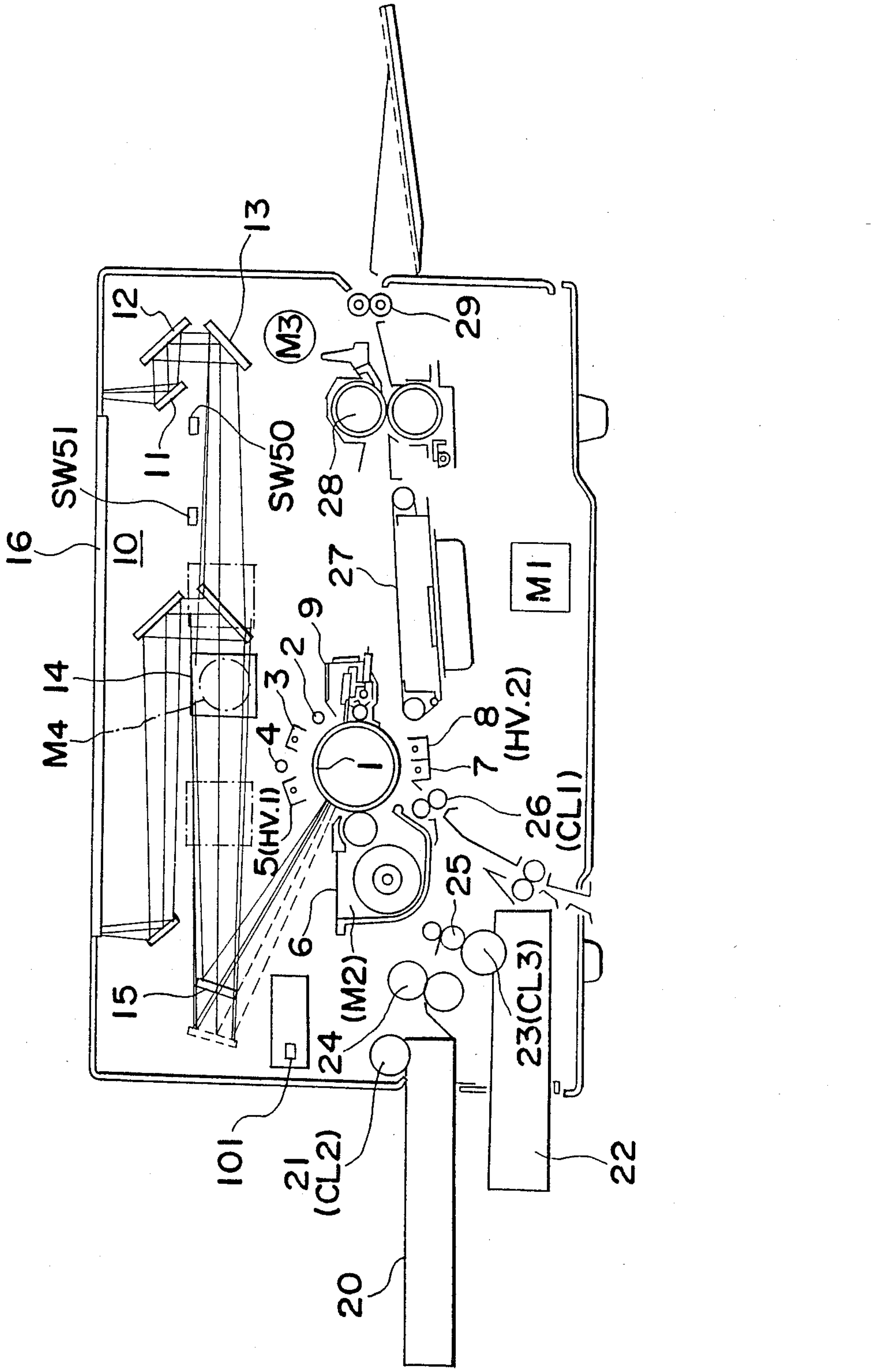
FIG. 1 is a schematic side view showing an example of a copying machine to which a magnification control device according to the present invention is applied.

Referring to FIG. 1, a photo-sensitive drum 1 is provided in the central part of a copying machine so as to rotate in a counter clockwise direction. There are disposed a main eraser lamp 2, a sub charger 3, a sub eraser lamp 4, a main charger 5, a developing device 6, a transfer charger 7, a separating charger 8 for separating a copying paper from the photo-sensitive drum 1 and a cleaning device 9 of a blade type around the photo-sensitive drum 1. The photo-sensitive drum 1 has its cylindrical surface coated with photo-sensitive material and the cylindrical surface of the photo-sensitive drum 1 is charged with a possible electro static charge by the chargers 3 and 5 during rotation of the drum 1. The photo-sensitive drum is adapted to be exposed to an image of an original to be copied through an optical system 10.

The optical system 10 is movably disposed under the transparent glass 16 for scanning the original put on the glass 16 and is composed of a light source (not shown), movable mirrors 11, 12 and 13, a lens 14 and a mirror 15. Said light source and the movable mirror 11 are adapted to move leftward at a speed of V/n (wherein V is rotation speed of the photo-sensitive drum 1 and n is a ration of magnification) and movable mirrors 12 and 13 are moved leftward at a speed of V/2n by a DC motor M3. When the copying magnification is to be changed, said lens 14 is moved along the optical axis of the lens and the mirror 15 is moved. The details of the magnification control will be described hereinafter.

In the left half portion of the copying machine, there are provided paper feeding units 20 and 22 each having paper feeding rollers 21 (CL2) and 23 (CL3). A paper feeding path is formed by a pair of rollers 24 and 25, a pair of timing rollers 26 (CLl), transferring belt 27, a fixing device 28 and a pair of paper discharging rollers 29.

A magnification setting key 101 is disposed inside the copying machine so as to be manually operable by an operator for setting various desired magnification ratios when the copying machine is forwarded from a factory.

Figure 3:
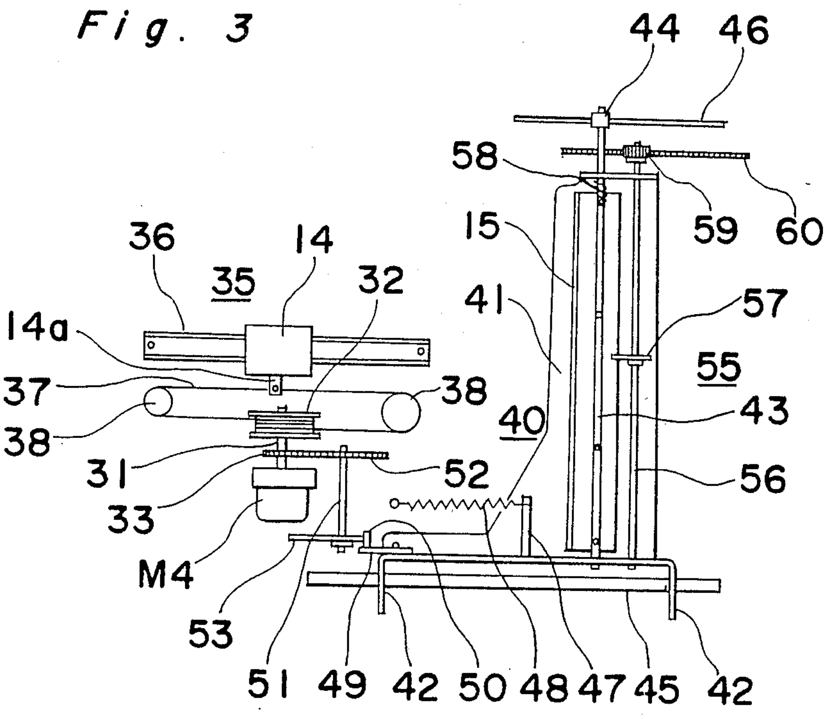
FIG. 3 is a partial plan view showing an essential portion of a magnification control mechanism used in the copying machine shown in FIG. 1.
Figure 4:
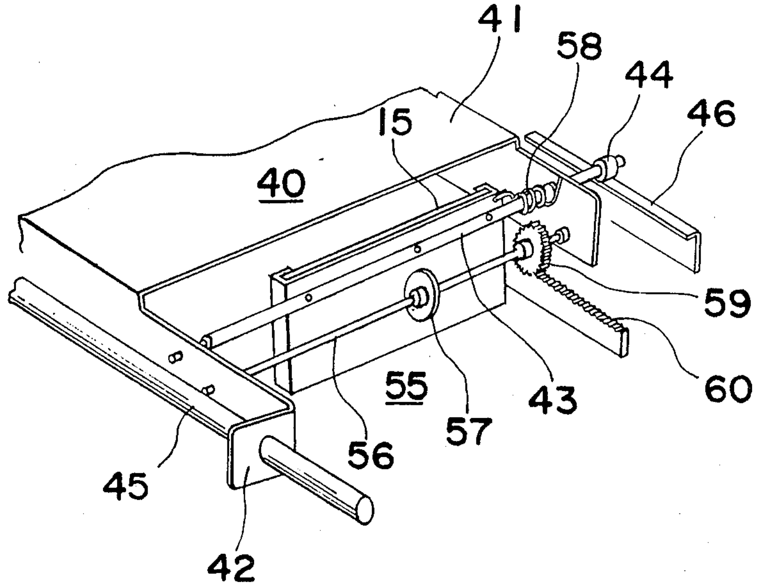
FIG. 4 is a partial perspective view showing an essential portion of the magnification control mechanism shown in FIG. 3.

Referring to FIGS. 3 and 4 there is shown a magnification control mechanism. In this embodiment, the magnification ratio can be changed continuously from 1.420 times (referred to as X 1.420) to 0.640 times (referred to as X 0.640) through an equivalent copy (referred to as X1).

The magnification control mechanism is generally composed of a lens moving mechanism 35, a mirror moving mechanism 40, a mirror swinging mechanism 55 and a stepping motor M4 for driving the above mechanisms.

In the lens moving mechanism 35, the lens 14 is movably mounted on rails 36 positioned in the light axial direction of the lens and a connecting arm 14*a* of the lens 14 is securedly coupled with a wire 37 suspended on a pair of pulleys 38 and a driving pulley 32 attached on a driving shaft 33 of the stepping motor M4 so that upon rotation of the stepping motor M4 in a forward or reversed direction at the predetermined speed, the lens 14 can be moved in the direction of the lens axis or leftward or rightward directions in FIG. 3 along the guide rail 36 and stopped at a position corresponding to a set magnification ratio.

Figure 2:
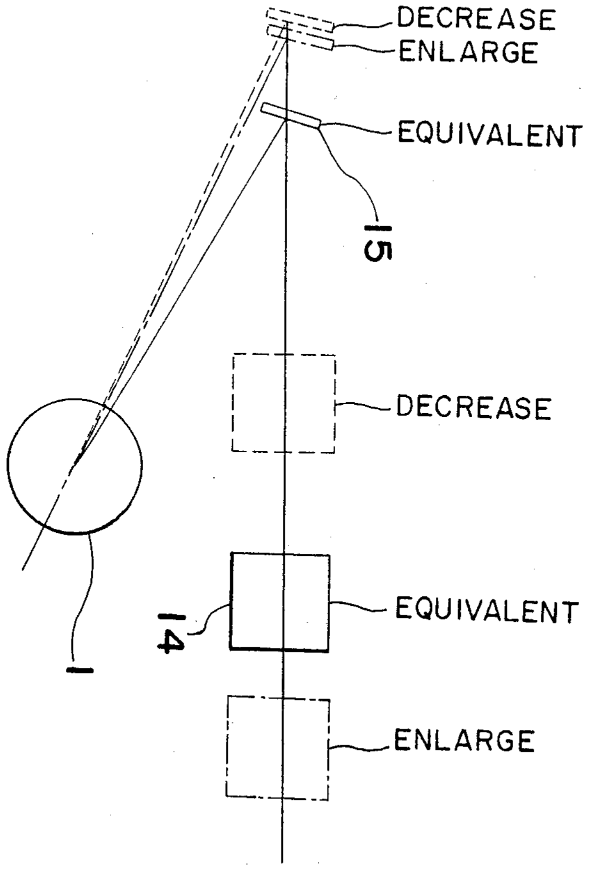
FIG. 2 is a schematic side view showing the principle of setting the copying magnification value used in the copying machine shown in FIG. 1.

In the mirror moving mechanism 40, the lens 15 has the rear face secured to a shaft 43 extending perpendicularly to the direction of the movement of the lens 14 and rotatably mounted on a moving member 41, the arms 42 of which are slidably engaged with a guide shaft 45 extending in a parallel direction of the guide rail 36. The shaft 43 has its one end provided with a roller 44 movably engaged with an auxiliary guide rail 46. A pin 50 is projected from a bracket 49 secured to the moving member 41 so that the pin 50 can abut onto a peripheral edge of a cam 53 supported by a supporting shaft 51 having a gear 52 rotatingly engageable with a gear 33 fitted to the rotation shaft 31 of the stepping motor M4. The moving member 41 is normally exerted by a coil spring 48 toward the cam 53. By this arrangement, upon rotation of the stepping motor M4, the cam 53 is rotated through rotation of the gears 33 and 52, so that the moving member 41 and the mirror 15 are swingingly moved in the direction of the light axis of the lens 14 corresponding to the outer peripheral shape of the cam 53 so as to compensate the variation of the length of the light path due to the change of the copying magnification. Specifically, the lens 14 and the mirror 15 are moved upon rotation of stepping motor M4 when the copying magnification is changed, and the lens 14 and the mirror 15 are moved to the positions as shown in FIG. 2 corresponding to the set copying magnification value. In the present embodiment, the stepping motor M4 can be rotated continuously for the stepless magnification setting. However, by using the magnification setting mechanism as shown in FIGS. 3 and 4, the magnification ratio can be changed in a stepped manner by rotating the stepping motor M4 by a predetermined angle at one time.

In the mirror swinging mechanism 55, a swing motion cam 57 is securely mounted on a supporting shaft 56 which is rotatably supported on the moving member 41 and the peripheral surface of the swing motion cam 57 is adapted to abut onto the rear surface of the mirror 15 which is exerted toward the cam 57 by a coil spring 58 mounted around the shaft 43. The supporting shaft 56 has its one end rotatably fitted in the hole defined on the moving member 42 and another end fitted with a pinion 59 engaged with a rack 60 secured to a frame of the copying machine so as to extend in parallel with the guide shaft 45. By this arrangement, when the moving member 41 is moved in response to the change of the copying magnification, the pinion 50 is rotatingly moved on the rack 60, causing the cam 57 and the supporting shaft 56 to be rotated, and in turn the mirror 15 is swung around the shaft 43 corresponding to the shape of the peripheral edge of the cam 57, so that the exposure point of the mirror 15 can be corrected. The reason why the correction of the angle of the mirror is necessary is described hereinafter. When the lens 14 and mirror 15 are displaced as shown in FIG. 2 for changing the magnification ratio, the image point formed on the photosensitive drum 1 by the light from the mirror 15 is displaced in response to displacement of the mirror 15. This displacement of the image point on the drum 1 can be prevented by swinging the mirror 15 so as to change the reflection angle of light of the mirror. In this correction, the swing angle of the mirror 15 is so defined that the light axis of the mirror 15 is directed to the center of the photo-sensitive drum 1 when the magnification is set at the maximum value. When the magnification ratio is smaller than the maximum value, the mirror 15 is so controlled that the image point on the photo-sensitive drum 1 is situated on the same image point for the maximum magnification ratio. By defining the image point on the photo-sensitive drum 1 as mentioned above, the light reflected from the mirror 15 is entered on the surface of the photo-sensitive drum 1 at a right angle so as to minimize the deformation of the image of a slit light formed on the photo-sensitive drum 1 for the maximum magnification wherein the deformation of the image of the slit light is maximum, thereby making the deformation of the light image on the photo-sensitive drum 1 to be negligible for the over all possible magnification ratios.

Figure 5:
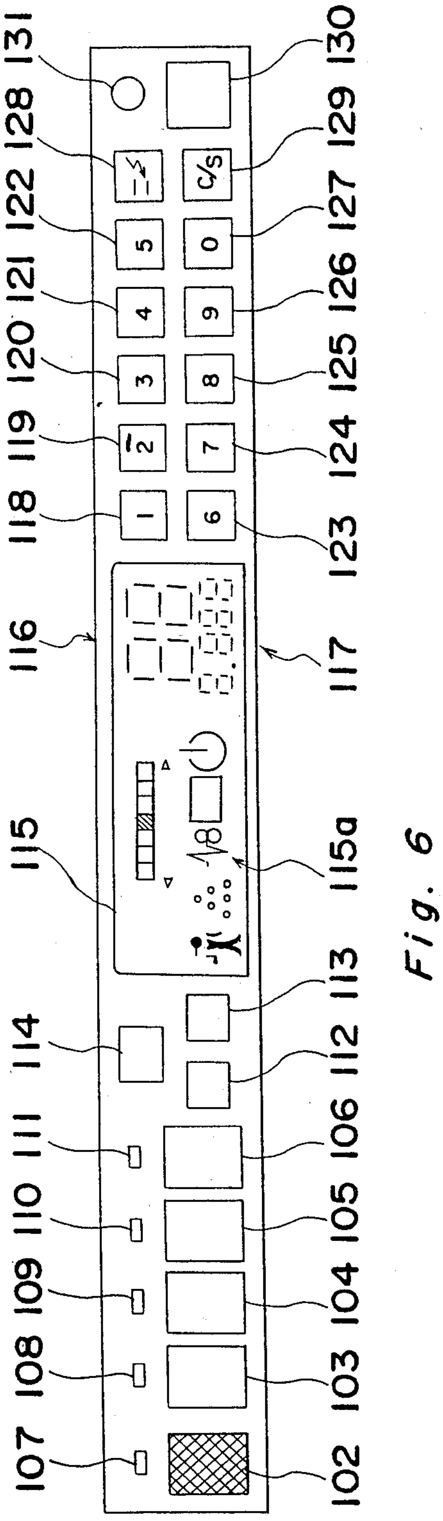
FIG. 5 is a top plan view showing an operation panel employed in the copying machine shown in FIG. 1.

Referring to FIG. 5 showing a top plan view of an operation panel of the copying machine shown in FIG. 1, there are provided a plurality of keys 102 to 106 for setting and selecting magnifications. The key 102 is used for selecting a hidden magnification mode which is used for setting or selecting hidden magnification ratios which are used for making a magnified copy with an irregular ratios by a user. The key 102 is referred to as HIDDEN MAGNIFICATION SET key hereinafter. The keys 103 to 106 are used for setting or reading a plurality of regular magnification ratios or the hidden magnification ratios into or from predetermined memory areas. The keys 103 to 106 are referred to as MAGNIFICATION SELECTING key. Once the magnification ratios are set, the magnification ratios are memorized in a memory as described hereinafter. An indicator 107 of a light emitting diode (LED) is provided for indication of operation of HIDDEN MAGNIFICATION key 102. Indicators 108 to 111 of LEDs are provided for indication of operation of the keys 103 to 106.

112 and 113 are exposure value selection keys for selecting the copy density and 114 is a counter reading key which is operated for reading out the contents of a total counter which counts the number of copies. Reference numeral 115 indicates a centralized display panel which is provided with a display unit 115*a* for displaying a "call serviceman", "tonner shortage", "paper jam" and "manual paper feeding", a copy number display unit 116 made of two digits of seven segmented numeric indicators for displaying the number of copies designated by user and a digital number displaying unit 117 made of seven segmented numeric indicators of four digits. Reference numerals 118 to 127 are ten keys including 0 to 9 keys and reference numeral 128 indicates an interruption key for enabling interruption copy. Reference numeral 129 indicates a CLEAR/STOP key, 130 indicates a PRINT key for instructing the copy start and 131 indicates a COPY INHIBITING indicator made of LED for indicating inhibition of a copy operation.

In this embodiment, the copying machine is so arranged as to select any one of a magnification ratio among eight kinds of magnification ratios which are usually not changed after the magnification ratios have been set and further arranged to be optionally set with a desired magnification value (referred to as MT). The eight kinds of the magnification ratios are further classified into designated magnification ratios of four kinds (referred to as MS1 to MS4) and the hidden magnification ratios of the remaining four kinds (referred to as MU1 to MU4). The designated magnification ratios MS1 to MS4 are provided for being set by a service man and the hidden magnification ratios MU1 to MU4 are provided for being set by the user. The magnification ratio can be changed by 1/1000 in the present embodiment. The designated magnification ratios MS 1 to MS4 are designated by such values that copies under the designated magnification ratios are expected to be used most frequently. Also the designated magnification ratios are defined by the user's need so that an equivalent copy is made under the magnification of not 1 but 0.95. These four magnification ratios MS1 to MS4 are memorized in the areas Q1 to Q4 of a RAM protected with a back up battery. The contents of the RAM can be read out by operation of any one of the keys 103 to 106. For example, by depressing the key 103, the magnification ratio MS1 is read out from the RAM then the copying machine is set by the magnification ratio MS1 and the ratio MS1 is displayed by the MAGNIFICATION indicator 117 in the centralized display panel 115 in a digital form.

The description is made to explain the manner of setting the hidden magnification ratios MU1 to MU4. The data of the magnification ratios MU1 to MU4 are memorized in the areas Q5 to Q8 in a RAM (FIG.6) and can be read out by operation of the keys 103 to 106. Specifically, upon operation of HIDDEN MAGNIFICATION SET key 102, the copying machine is brought into HIDDEN MAGNIFICATION SETTING mode with HIDDEN MAGNIFICATION indicator 107 turned on, causing MAGNIFICATION indicator 117 to be turned off, whereby the magnification ratio which was set in the previous copying operation is diminished. Under this condition, since a desired magnification ratio has not yet been set, the COPY INHIBITING indicator 131 is turned on with the copying operation kept inhibited. Upon operation of the keys 103, for example, the hidden magnification ratio MU1 is read out from the area Q5 of the RAM and the copying machine is set with the magnification ratio MU1, which is indicated by the MAGNIFICATION indicator 117. The COPY INHIBITING indicator 131 is turned off.

The temporary magnification ratio is set as follows. Upon operation of the HIDDEN MAGNIFICATION SETTING key 102 is operated, the HIDDEN MAGNIFICATION indicator 107 is turned on and the MAGNIFICATION indicator 117 is turned off with the COPY INHIBITING indicator 131 turned on. Subsequently, the desired magnification ratio is input by operation of the ten keys 118 to 127, so that each numeric character of the magnification ratio thus input is displayed by the MAGNIFICATION indicator 117, causing the magnification ratio to be memorized in the area Q9 of the RAM. By the key input of the first digit of the magnification ratio, the COPY INHIBITING indicator 131 is turned off for enabling the operation of the PRINT key 130. When the PRINT key 130 is operated, the copying operation is initiated. Through this operation, if the magnification ratio entered by the ten keys exceeds four digits, the data lesser than fifth digits are disabled. Furthermore, if the magnification ratio entered is smaller than four digits at the time of entrance of the signal of the PRINT key 130, the digits to which the data has not been entered are dealt as 0. Also, if the magnification ratio entered is smaller than the value X 0.640, the magnification value is deemed as X 0.640. On the contrary, if the magnification ratio entered is larger than X 1.420, the magnification ratio is deemed as X 1.420. The magnification ratio once registered in the copying machine is effective until it is artificially changed.

The designated magnification ratios MS1 to MS4 can be set by a service man or at the time of a factory forwarding in such a manner as described hereinafter. When the key 101 (See FIG. 1) situated inside the copying machine so as to prevent operation by a user of the copying machine is operated, the copying machine is brought into a DESIGNATED MAGNIFICATION SET mode. Upon operation of the key 101, the indicators 107 through 111 are turned off and the value in the MAGNIFICATION indicator 117 is turned off, the COPY INHIBITING indicator 131 is turned on. Subsequently, the desired magnification ratio is input by operation of the ten keys 118 through 127, subsequently, one of the keys 103 through 106, for example, the key 103 is operated, the magnification ratio thus entered is memorized in one of the areas Q1 through Q4 corresponding to the operated keys 103 through 106. In this example, the magnification ratio is memorized in the area Q1 corresponding to the key 103. The indicator 108 is turned on.

The hidden magnification ratios MU1 through MU4 are set by the user of the copying machine as described hereinafter. When HIDDEN MAGNIFICATION SET key 102 is operated, the copying machine is brought into the HIDDEN MAGNIFICATION mode with HIDDEN MAGNIFICATION indicator 107 and the COPY INHIBITING indicator 131 are turned on with the MAGNIFICATION indicator 117 turned off. Subsequently, the desired magnification ratio is input by operation of the ten keys 108 through 127 and in turn any one of the keys 103 through 106 is operated so that the magnification ratio thus input is memorized in any one of the areas Q5 through Q8 corresponding to the operated keys 103 through 106.

From the foregoing, it can be said that upon operation of the ten keys and PRINT key, the copy is made under the magnification value entered by the ten keys in the temporary magnification mode, on the contrary, upon operation of the ten keys and the keys 103 through 106, the auxiliary magnification value MU1 through MU4 can be set in the copying machine.

Upon operation of the CLEAR STOP key 129, the magnification ratio that has been entered in the copying machine can be cleared off, therefore if the ten keys 118 through 127 are erroneously operated at the time of entering of the magnification ratio, the wrong magnification ratio can be cleared off by operating the CLEAR/STOP key 129 so as to enable the system to input the correct magnification ratio.

After MAGNIFICATION SETTING mode is set upon operation of the key 101, if the key 101 is operated again before the ten keys are not operated, the magnification value set in the past is kept unchanged. The same operation can be performed by the key 102.

Figure 6:
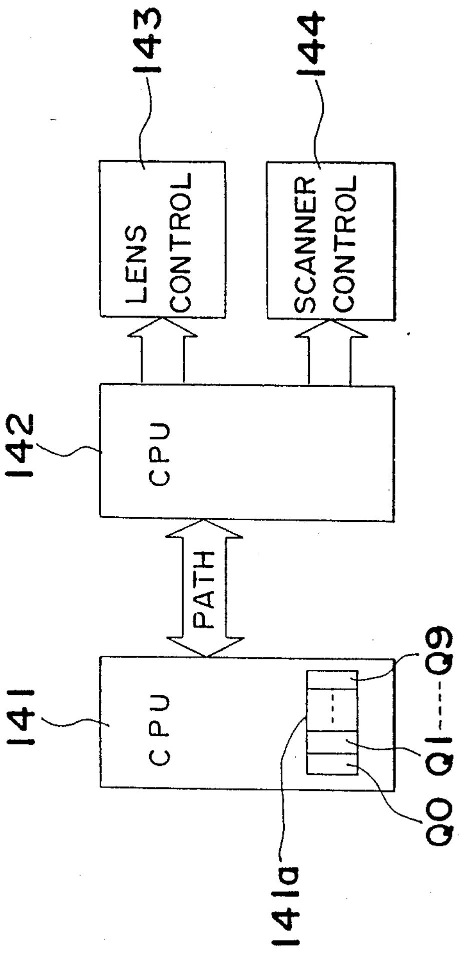
FIG. 6 is a block diagram showing a control device used in the copying machine shown in FIG. 1, FIGS. 7 through 19 are flow charts showing the process of magnification control according to the present invention, FIG. 20(20*a* and 20*b*) is a block diagram showing the detailed circuit of the control device of the copying machine shown in FIG. 1, FIG. 21(21*a* and 21*b*) is a flow chart showing an operation of the various elements used in the copying machine shown in FIG. 1.

Referring to FIG. 6, a CPU 141 made of a microcomputer controlling various operations of the copying machine is provided with the RAM (random access memory) 141*a*. The RAM 141*a* comprises a memory area Q0 for temporarily memorizing various data entered by the ten keys 118 through 127, the memory areas Q1 through Q4 for memorizing the designated magnification ratios MS1 through MS4, the memory areas Q5 through Q8 for the hidden magnification ratios MU1 through MU4 and the memory area Q9 for temporarily memorizing the magnification ratio data read out of the RAM or the temporary magnification ratio MT. The RAM 141*a* is backed up by a battery for data protection.

Another CPU 142 of a microcomputer type is provided for controlling the movement of the lens at the time of magnification setting and the scanning speed of the scanner. The CPU 141 transfers the magnification data and the scan timing to the CPU 142 which transfers the timing signals of paper feed and the signal representing the movement of the lens. The CPU 142 produces the control signals for the lens moving controlling circuit 143 and the scanner controlling circuit 124.

Figure 8:
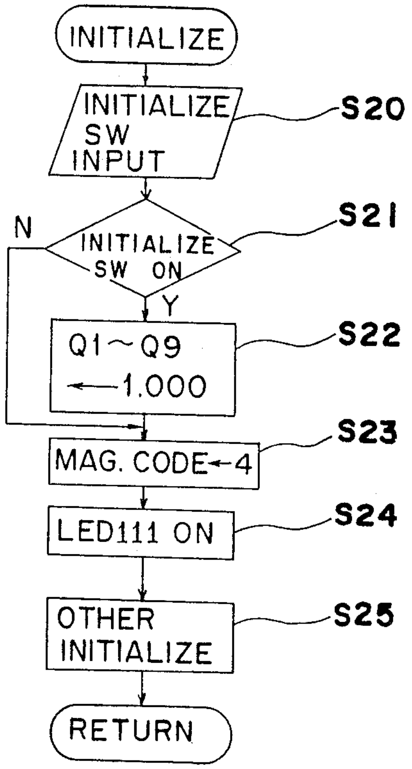

Detailed operation of the control circuit shown in FIG. 6 is described with reference to the flow charts shown in FIG. 8. In the step S20, a signal of an initialize switch (not shown) is entered to the first CPU 141. The initialize switch is provided for judging whether or not the RAM 141*a* is initialized. In the copying machine used in the present embodiment, the CPU 141 is of a CMOS type and the data stored in the RAM 141*a* can be protected by the battery so that the data in the RAM can be preserved even if the commercial power fails or the power source plug of the copying machine is removed from the power source receptacle. Accordingly, in case of resetting the CPU 141 at the very beginning, the data in the CPU 141 are useless, so that the magnification ratios should be initialized. The initialize switch is used for this purpose.

If the initialize switch is on, all of the memory areas Q1 through Q8 are set by X1.000 in the step S22. The magnification code is set to 4 in the step S23 which means that the designated magnification ratio MS4 of X1.000 is set in the copying machine. It is noted that the magnification codes 1 to 9 represent each of the magnification ratios MS1 to MS4, MU1 to MU4 and MT. The indicator 111 is turned on in the step S23 for indicating that the key 106 is effective for copying. In the step S24, various data such as flags, output data, and communication data are initialized. In a case where the initializing switch is not turned on, the program flow goes to the step S23 so as to use the magnification data memorized already in the memory areas Q1 through Q9 by operation of the service man or user.

Figure 7:
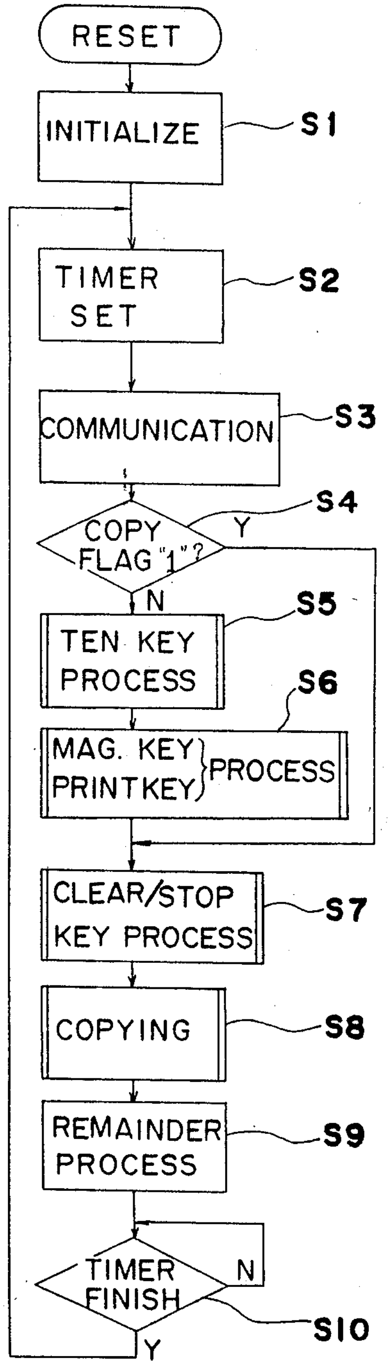

Turning to FIG. 7, a timer for defining the length of time of one routine in the CPU 141 is set at the step S2, then the program flow goes to the step S3 so as to transfer the magnification value or other necessary data to the CPU 142. Also the CPU 142 transfers various data such as paper feeding timing to the CPU 141. The data received is stored in the RAM 141*a*. The state of a copy flag which is made 1 during copy is judged in the step S4 and the program flow advances to either the step S5 if copy is not performed or step S7 if copy is performed. In the step S5, the input data fed from the ten keys 118 through 127 are processed and in the step S6, the keys 101 through 106 and PRINT key 130 are processed. In the step S7, CLEAR/STOP key 129 is processed and the program flow goes to the step S8 in which the copying control is made and in the step S9 the remaining operation such as setting of the exposure value due to operation of the keys 112 and 113 are processed. In the step S10, the internal timer is judged so as to complete one routine of the program within 20 milli seconds. If the internal timer is finished the program flow goes to the step S2.

It is noted that in the flow charts, the term MAG. is an abbreviation of the term "magnification" and the term SMS. is abbreviation of the term "magnification setting mode".

Figure 9:
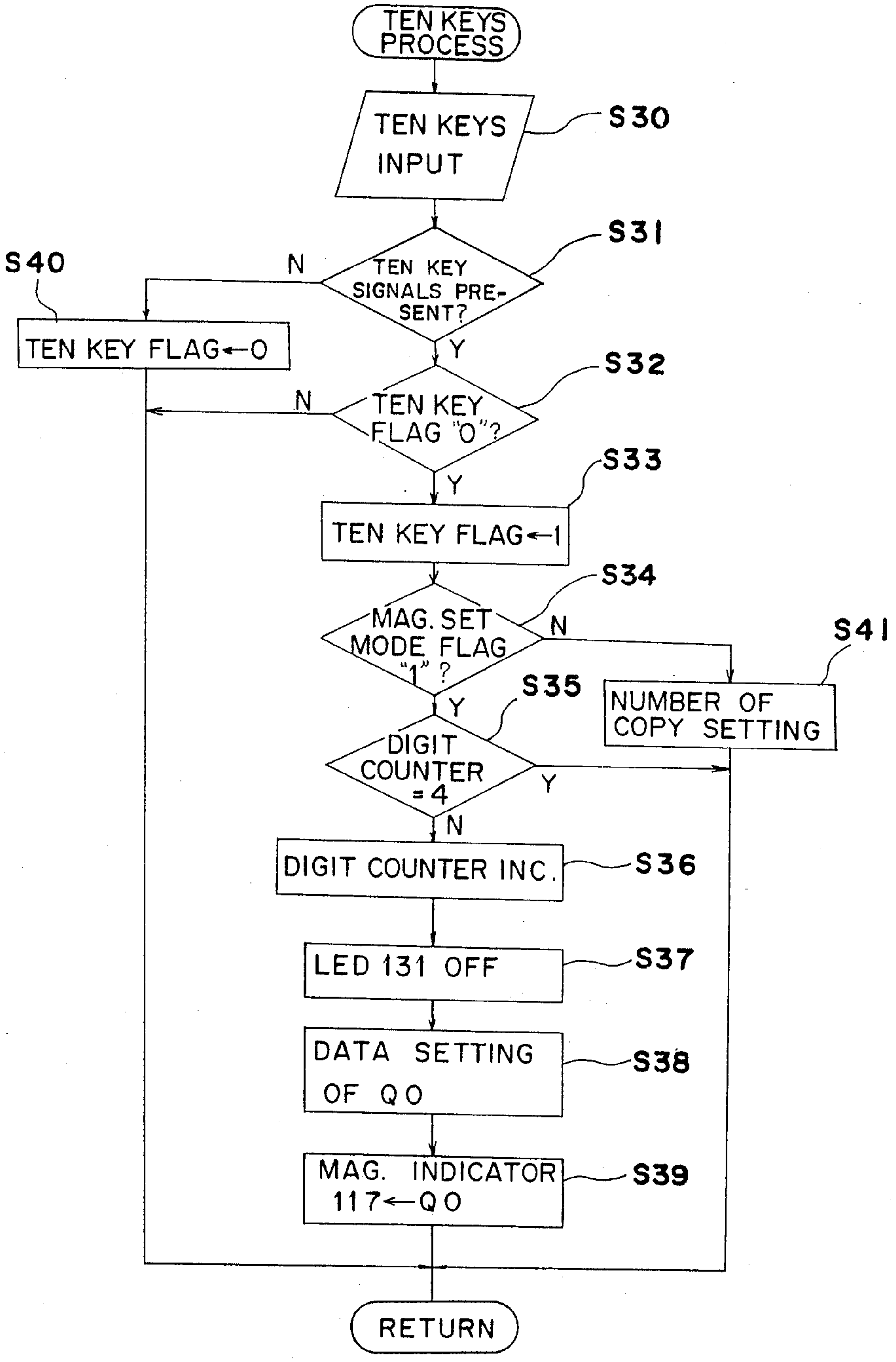
Figure 10A:
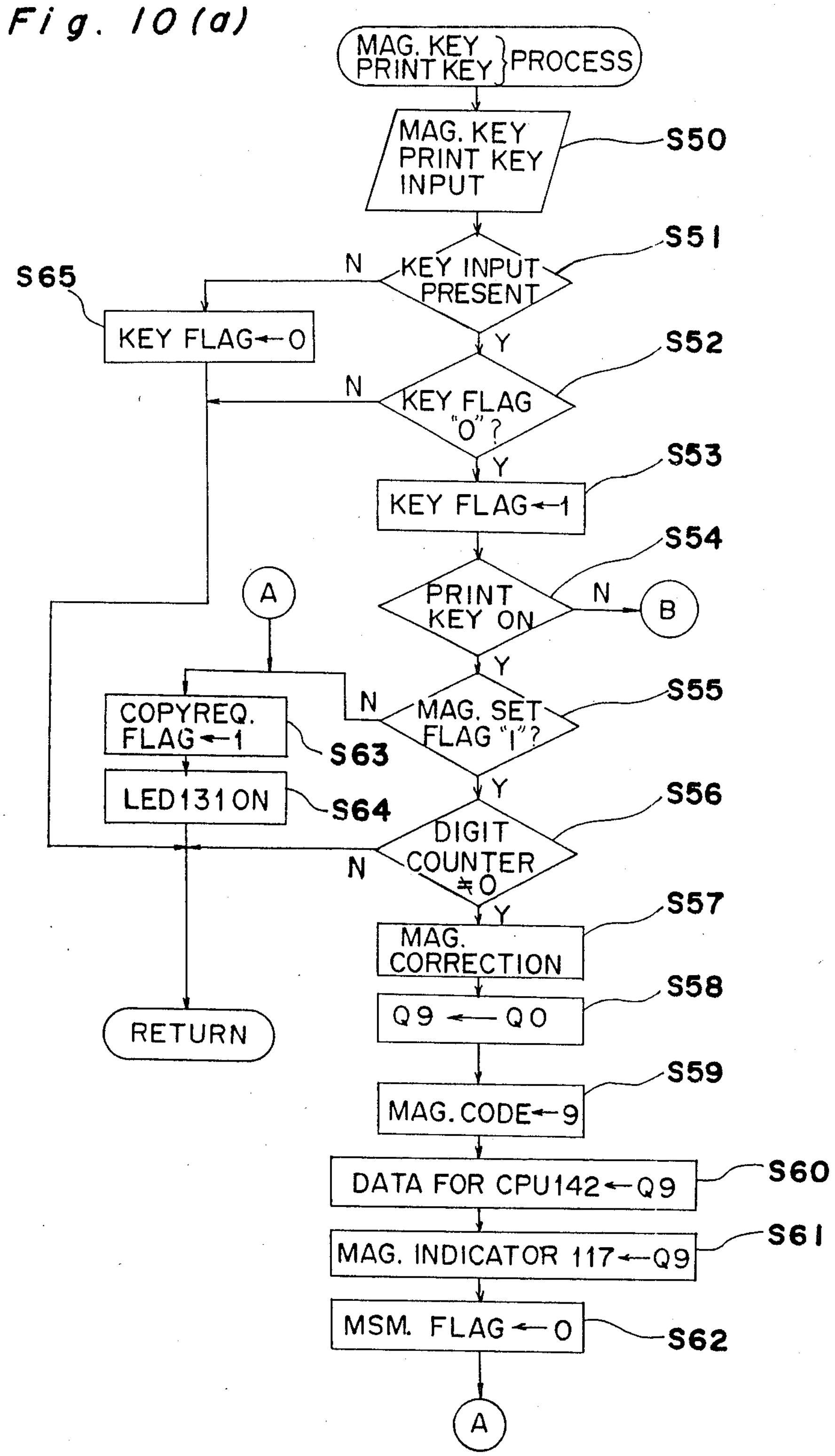
Figure 10B:
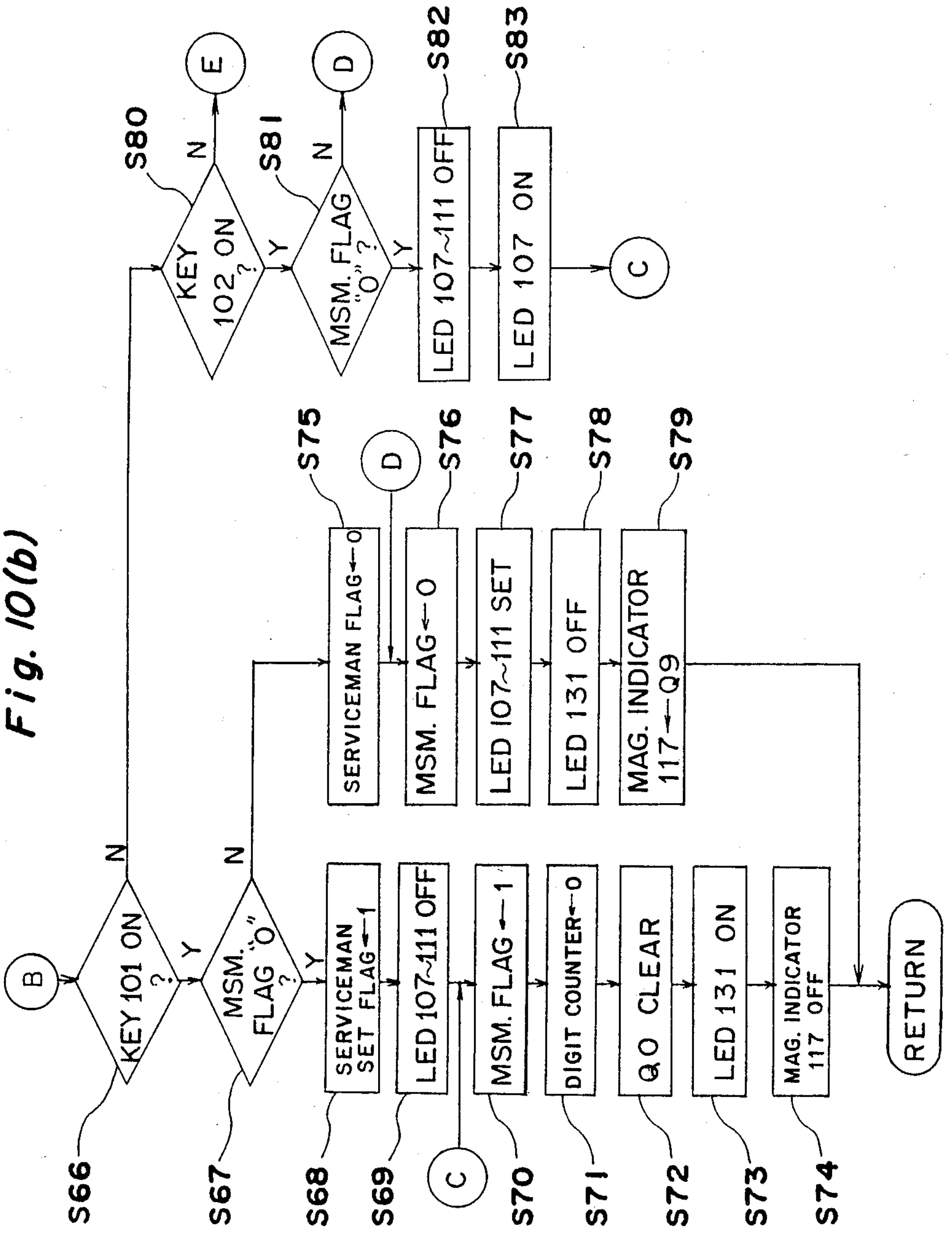

Referring to FIG. 9 showing the manner of processing the signals from the ten keys, the data are input by the ten keys 118 through 127 in the step S30. It is judged in the step S31 whether or not the input data is present and if there is a data input, a positive going edge of the key signal is detected in the step S32. In this embodiment, presence or absence of the ten key signals of the last one routine in the past are memorized by means of a flag of TEN KEY, and if the positive going edge is detected under the state that TEN KEY flag is "0", the CPU 141 judges that there are new input data in the present routine and sets the TEN KEY flag to "1" in the step S33 for the subsequent routine. If the absence of the ten key input is detected in the step S31, the CPU 141 resets the TEN KEY flag to "0" in the step S40 and the program flow goes to RETURN. Even if there is a ten key input, if the TEN KEY flag is already "1" in the step S32, this means that the input signal is not positive going edge, the program flow goes to RETURN directly. Thus, the processing steps after the step S33 are performed only when the positive going edge of the ten key input is present.

In the step S34, a MAGNIFICATION SETTING MODE flag is judged. The MAGNIFICATION SETTING MODE flag is set to "1" when the entry of the magnification data from the ten keys 118 through 127 is allowed. If the MAGNIFICATION SETTING MODE is not set, the program flow goes to the step S41 for setting the data from the ten keys 118 through 127 in the copying machine as the number of copy which means the number of papers to be copied for a sheet of the original. When the MAGNIFICATION SETTING MODE is set, data memorized in a digit counter is judged in the step S35. The digit counter counts the number of digits of the data of the magnification ratio entered by the ten keys during the MAGNIFICATION SETTING MODE. The digit counter is reset to "0" at the time of beginning of the MAGNIFICATION SETTING MODE. If the content of the digit counter is not "4", the program flow goes to the step S36, but if the content of the digit counter is "4", the program flow goes to RETURN since "4" digits of the magnification value has been entered without processing the new data entered by the ten key at the present time. In the step S36, the content of the digit counter is incremented and the program flow goes to the step S37 to turn the COPY INHIBITING indicator 131 off. This operation enables to start the copy operation so far as one digit of the magnification ratio is entered. Then the program flow goes to the step S38 so as to memorize the magnification data entered at the present operation period in the memory area Q0. The data memorized in the area Q0 are displayed in the MAGNIFICATION indicator 117 in the step S39. The MAGNIFICATION indicator 117 indicates the entered MAGNIFICATION ratio beginning from the most significant digit.

Referring to FIGS. 10 through 14, signals from the keys 101 through 106 and the signal from the PRINT key 130 are entered in the CPU 141 in the step S50, then the program flow goes to the step S51 for judging which of the keys is operated. If the key input is absent, the program flow goes to the step S65 to reset the KEY flag to "0" and goes to RETURN. If the key input is present, the program flow goes to the step S52 to judge whether or not the KEY flag is "0" so as to judge the positive going edge of one of the keys 101 through 106 by the state of the KEY flag representing the presence or absence of the key input during the period of 1 earlier routine. If the KEY flag is "0" which means the positive going edge of the key, the program flow advances to S53 to set the KEY flag to "1", and in turn the program flow advances to S54 so as to judge whether or not the key input is made by the PRINT key 130. If the PRINT key 130 is on, MAGNIFICATION SETTING MODE flag is judged in the step S55. MAGNIFICATION SETTING MODE flag is set to "1" when the key 101 or HIDDEN MAGNIFICATION SET key 102 are operated. In case of "0" of MAGNIFICATION SETTING MODE flag, the program flow advances to S63 to set COPY REQUEST flag which acts to execute the COPY PROCESS routine and in turn advances to S64 to turn on COPY INHIBITING indicator 131. In case of "1" of MAGNIFICATION SETTING MODE flag, the program flow advances to S56 to judge the content of "0" of the digit counter so as to decide whether or not to allow execution of the print using the temporary magnification ratio $M_T$. In case of "0" of the digit counter, which means that the data has not been entered since the MAGNIFICATION SETTING MODE was set, then the program flow advances to RETURN. Under this condition the magnification correction in the step S57 can not be made and the copy can not be started. In a case where the content of the digit counter is not 0 (zero), which means that more than one digit of the data of the magnification ratio has been entered, the magnification ratio entered is checked in the step S57 with the correction of the magnification value if necessary. Thereafter, the data in the area Q0 is transferred to the area Q9 for setting the temporary magnification value $M_T$ in the copying machine, thereby executing COPY PROCESS routine.

Figure 15:
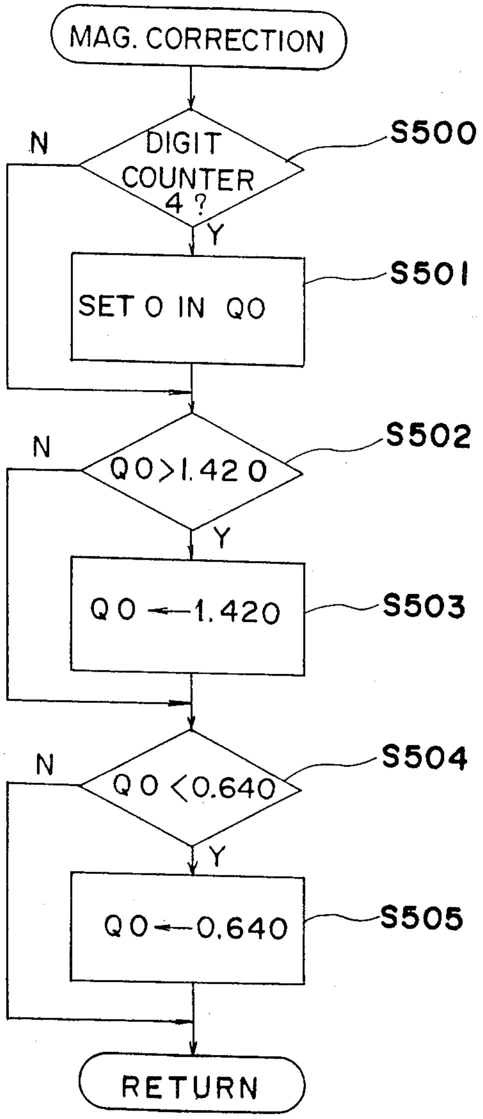

FIG. 15 shows detailed procedures of one example of the correction to the magnification ratio, wherein in the step S500 it is judged that whether or not the number of the content of the digit counter is 4. In case of not 4, 0(zero) is set in the memory area Q0 in the step S501. In case of 4 of the digit counter, the program flow advances to S502 to judge whether or not the content memorized in the area Q0 exceeds over 1.420 which is the possible largest magnification in the range between 0.640 through 1.420, and if the content exceeds 1.420, the content is corrected to 1.420 in the step S503. If the content of the area Q0 is smaller than 0.640, the content is corrected to 0.640 in the step S505.

Referring to FIG. 10 again, after correction of the magnification ratio in the step S57 as described above, the magnification ratio adopted is transferred to the area Q9 in the step S58. Magnification code 9 showing the temporary magnification is set in the step S59 and in turn in the step S60 the data in the memory area Q9 is moved to the area for storing the data for transferring to the CPU 142. The content of the memory area Q9 is displayed by the MAGNIFICATION indicator 117 in the step S61, and in turn the MAGNIFICATION SETTING MODE flag is cleared off to "0", then the program flow advances to the step S63 to set COPY REQUEST flag for execution of COPY routine, and further advances to the step S64 to turn the COPY INHIBITING indicator 131 on so as to inhibit entrance of the PRINT key 130 input after the copy operation is executed.

If it is detected in the step S54 that the PRINT key 130 is not operated, the program flow advances to S66 to judge the input of the key 101. In case of "on" of the key 101, the program flow advances to S67 to judge MAGNIFICATION SETTING MODE flag. In case of "0" of MAGNIFICATION SETTING flag, SERVICEMAN SET flag is set to "1" in the step S68, turning the indicators 107 through 111 off in the step S69 and setting MAGNIFICATION SETTING MODE flag to "1" in the step S70.

When the DESIGNATED MAGNIFICATION mode is selected, the MAGNIFICATION SETTING MODE flag is made "1", In the step S71 digit counter is reset, and the memory area Q0 is cleared off in the step S72, COPY INHIBITING indicator 131 is turned on in the step S73, and the MAGNIFICATION indicator 117 is turned off in the step S74. Since the magnification RATIO is not still entered in the above state, and therefore, copy can not be made, the COPY INHIBITING indicator 117 is turned on. If it is judged in the step S67 that MAGNIFICATION SETTING MODE flag is "1", the operation of the key 101 at this operation period releases the MAGNIFICATION SETTING MODE. Namely in the steps S75 and S76 SERVICEMAN SET flag and MAGNIFICATION SETTING flag are reset and one of the indicators 108 through 111 is turned on. Then COPY INHIBITING indicator 131 is turned off in the step S78 and the content of the memory area Q9 which is the most recent magnification ratio is displayed in the MAGNIFICATION indicator 117 in the step S79.

If it is detected in the step S66 that the key 101 is off, the program flow advances to S80, wherein upon detection of an on state of the key 102, MAGNIFICATION SETTING MODE flag is judged in the step S81. If MAGNIFICATION SETTING MODE flag is "0", the indicators 108 through 117 are turned off and thereafter the HIDDEN MAGNIFICATION indicator 107 is turned on in the step S83 and the program flow advances to S70. In a case where MAGNIFICATION SETTING MODE flag is "1" is judged in the step S81, the steps after S76 are performed for releasing MAGNIFICATION SETTING mode.

Figure 11:
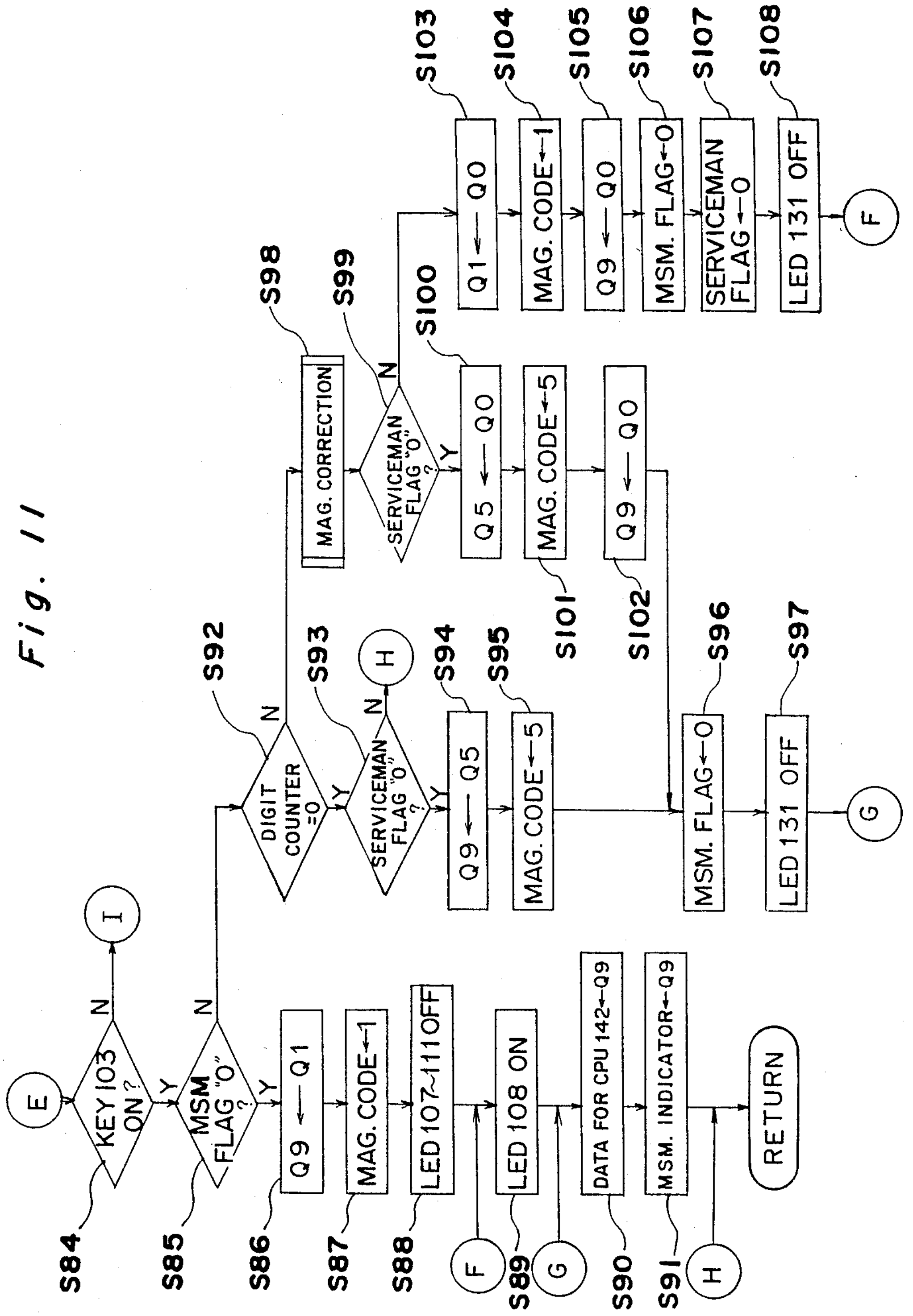

When an off state of the key 102 is judged in the step S80, the program flow advances to S84 shown in FIG. 11 to judge input of the key 103. If an on state of the key 103 is judged in the step S84, the program flow advances to S85, wherein if it is detected that MAGNIFICATION SETTING MODE flag is "0", the designated magnification ratio MS1 is selected. Specifically, the magnification data MS1 stored in the memory area Q1 are transferred to the memory area Q9 in the step S86, causing the magnification code to be "1" in the step S87, thereafter all of the indicators 107 through 111 are turned off in the step S88 and the indicator 108 is turned on in the step S89. The magnification date stored in the area Q9 are transferred to the CPU 142 in the step S90 and displayed on the MAGNIFICATION indicator 117 in the step S91.

If "1" of MAGNIFICATION SETTING MODE flag is detected in the step S85, the digit counter is judged in the step S92. If the contents of the digit counter is "0", SERVICEMAN SET flag is judged in the step S93. If SERVICEMAN SET flag is "0", the hidden magnification ratio MU1 is transferred from the memory area Q5 to the memory area Q9 in the step S94, and the magnification code "5" is set in the step S95. Subsequently, MAGNIFICATION SETTING MODE flag is reset in the step S96 and the COPY INHIBITING indicator 131 is turned off in the step S92, whereby the step advances to S90.

In the case where SERVICEMAN SET flag is "1", the step advances to RETURN since data have not yet been entered under the DESIGNATED MAGNIFICATION SETTING MODE.

If the content of the digit counter is not zero as judged in the step S92, the designated magnification ratio MS1 or hidden magnification ratio MU1 can be entered by the operation of the key 103. Thus, the magnification entered can be corrected in the MAGNIFICATION CORRECTING routine, and if the SERVICEMAN SET flag is "0" by the judgement of the step S99, the hidden magnification ratio MU1 can be set, and the data in the memory area Q0, which are corrected in the step S98, are transferred to the memory area Q5 in the step S100. Also, the magnification code "5" is entered in the step S101 and the data in the memory area Q0 (which are equal to the data in Q5) are transferred to the memory area Q9 in the step S102, then the program flow advances to the step S96. In a case where SERVICEMAN SET flag is "1" in the step S99, the designated magnification MS1 is set and selected, so that the data in the memory area Q0 are transferred to the memory area Q1 in the step S103. SERVICEMAN SET flag and MAGNIFICATION SETTING MODE flag are reset in the steps S106 and S107 and in turn COPY INHIBITING indicator 131 is turned off in the step S 108, then the program flow advances to the step S89.

Figure 12:
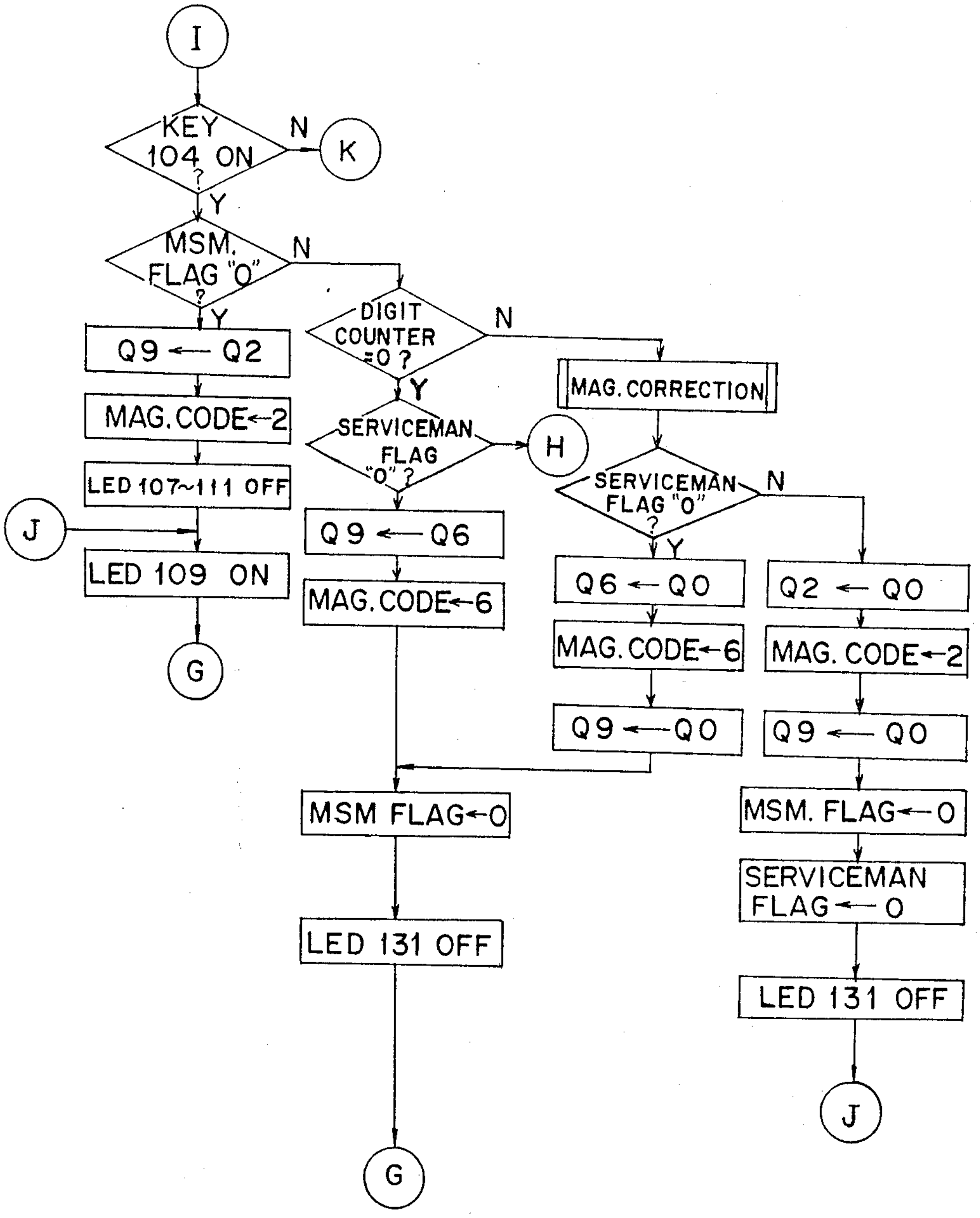
Figure 13:
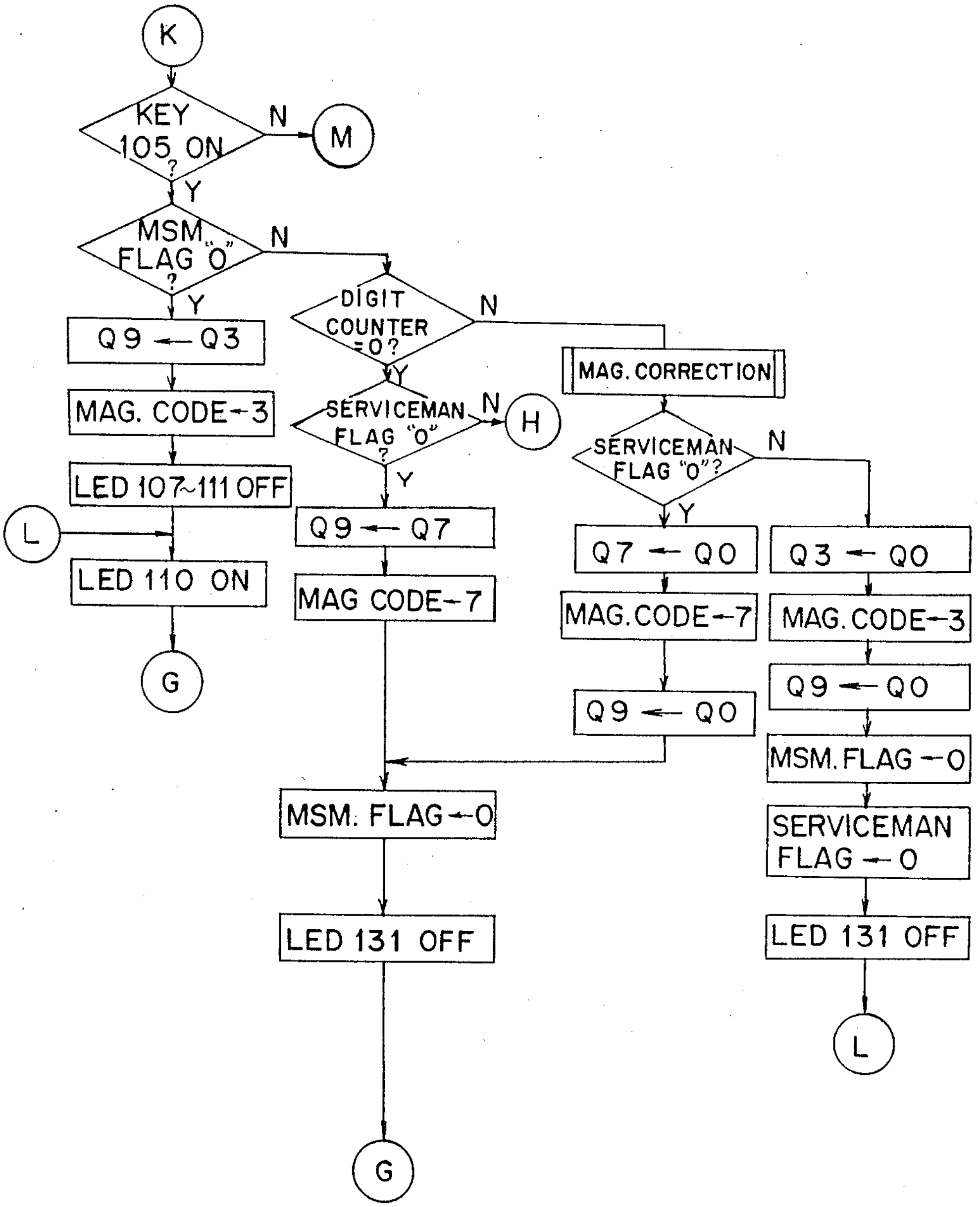
Figure 14:
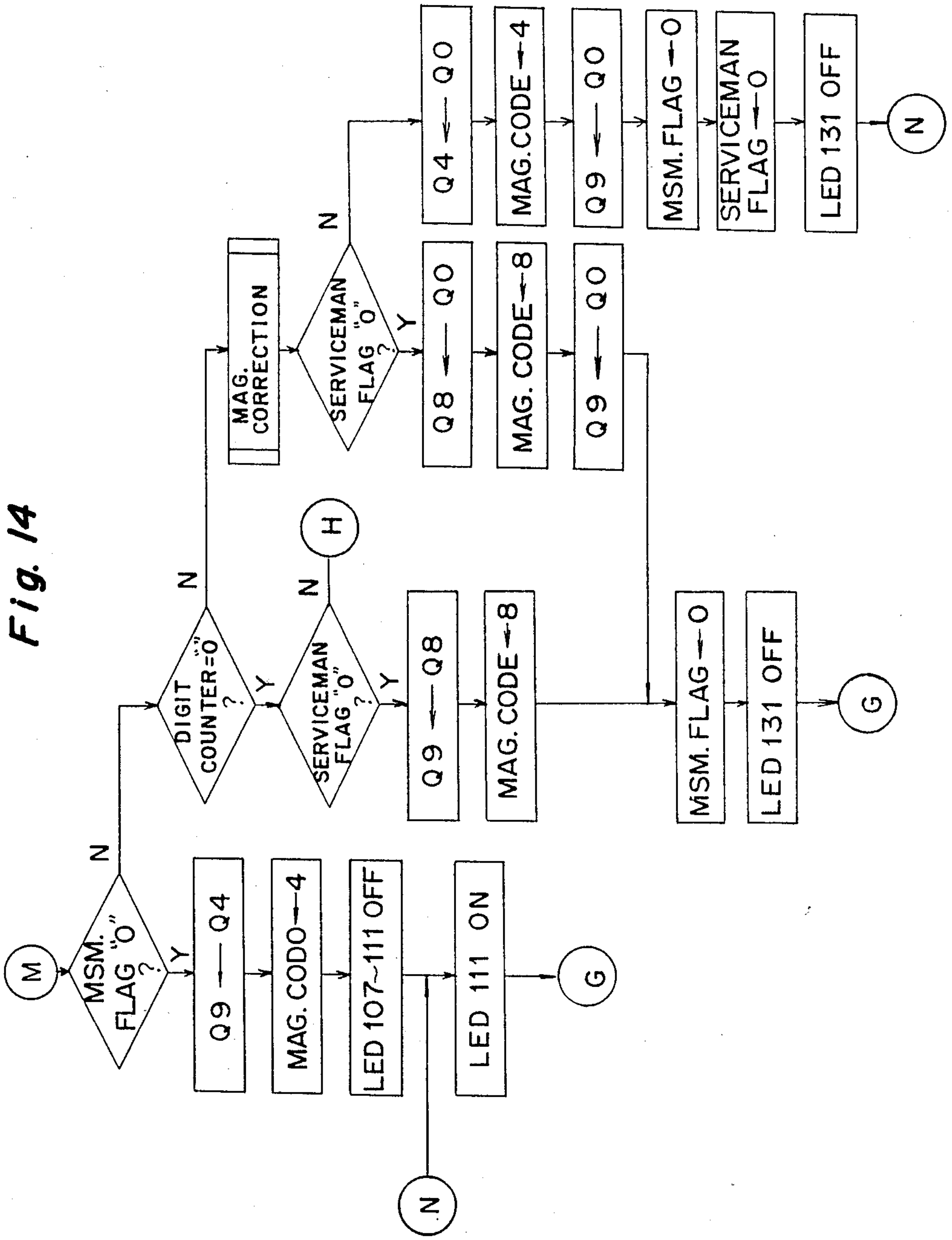

The process of the inputs with respect to the keys 104 through 106 is similar to those in case of the key 103 as shown in FIGS. 12 through 14. The steps following step M in the flow chart in FIG. 14 are the procedures for the key 106.

A first modification of setting the magnification ratio is described hereinafter.

At first, HIDDEN MAGNIFICATION key 102 is depressed. By this operation, HIDDEN MAGNIFICATION indicator 107 is turned on and HIDDEN MAGNIFICATION SETTING mode is set with the magnification ratio already set in the past disabled, in turn the indicators 108 through 111 and MAGNIFICATION indicator 117 are respectively turned off. By depressing any one of the keys 103 through 106, a hidden magnification ratio corresponding to the depressed key is set in the copying machine. The magnification ratio thus set is displayed in the MAGNIFICATION indicator 117. Upon depressing HIDDEN MAGNIFICATION key 102 again without depression of any one of the keys 103 through 106, HIDDEN MAGNIFICATION SETTING mode can be disabled, whereby the designated magnification ratio previously set in the past can be enabled again.

The purpose of this embodiment is to facilitate the copy operation under the designated magnification which is usually used frequently.

A second modification is made in such a manner that HIDDEN MAGNIFICATION indicator 107 is turned on upon depression of HIDDEN MAGNIFICATION SET key 102 when HIDDEN MAGNIFICATION SETTING mode is enabled and the indicator 107 is turned off when HIDDEN MAGNIFICATION SETTING mode is disabled. By this arrangement, the operator of the copying machine can recognize the magnification ratio presently set in the copying machine by watching the state of the indicators 107 and 108 through 111.

For example, in order to set the designated magnification ratio corresponding to the key 106, the operator judges first whether or not HIDDEN MAGNIFICATION indicator 107 is lit. If the indicator 107 is lit, the operator depresses HIDDEN MAGNIFICATION SET key 102 for enabling DESIGNATED MAGNIFICATION SETTING mode, thereby causing HIDDEN MAGNIFICATION indicator 107 to be turned off and in turn depresses the key 106. In this case, if the hidden magnification ratio corresponding to the key 106 is already set, the designated magnification ratio corresponding to the key 106 can be set by the depression of only HIDDEN MAGNIFICATION SET key 102. In this embodiment, the operability of the designated magnification and the hidden magnification is equivalent in other words, there is no priority in terms of setting of the designated magnification ratio and the hidden magnification ratio.

In the second modification, if none of the keys 103 through 106 is depressed with the key 102 depressed, there may occur such a case that none of magnification rates are set in the copying machine.

A third modification is made in such a manner that the magnification copy can be enabled only when the key 102 and any one of the keys 103 through 106 are depressed simultaneously.

Figure 17:
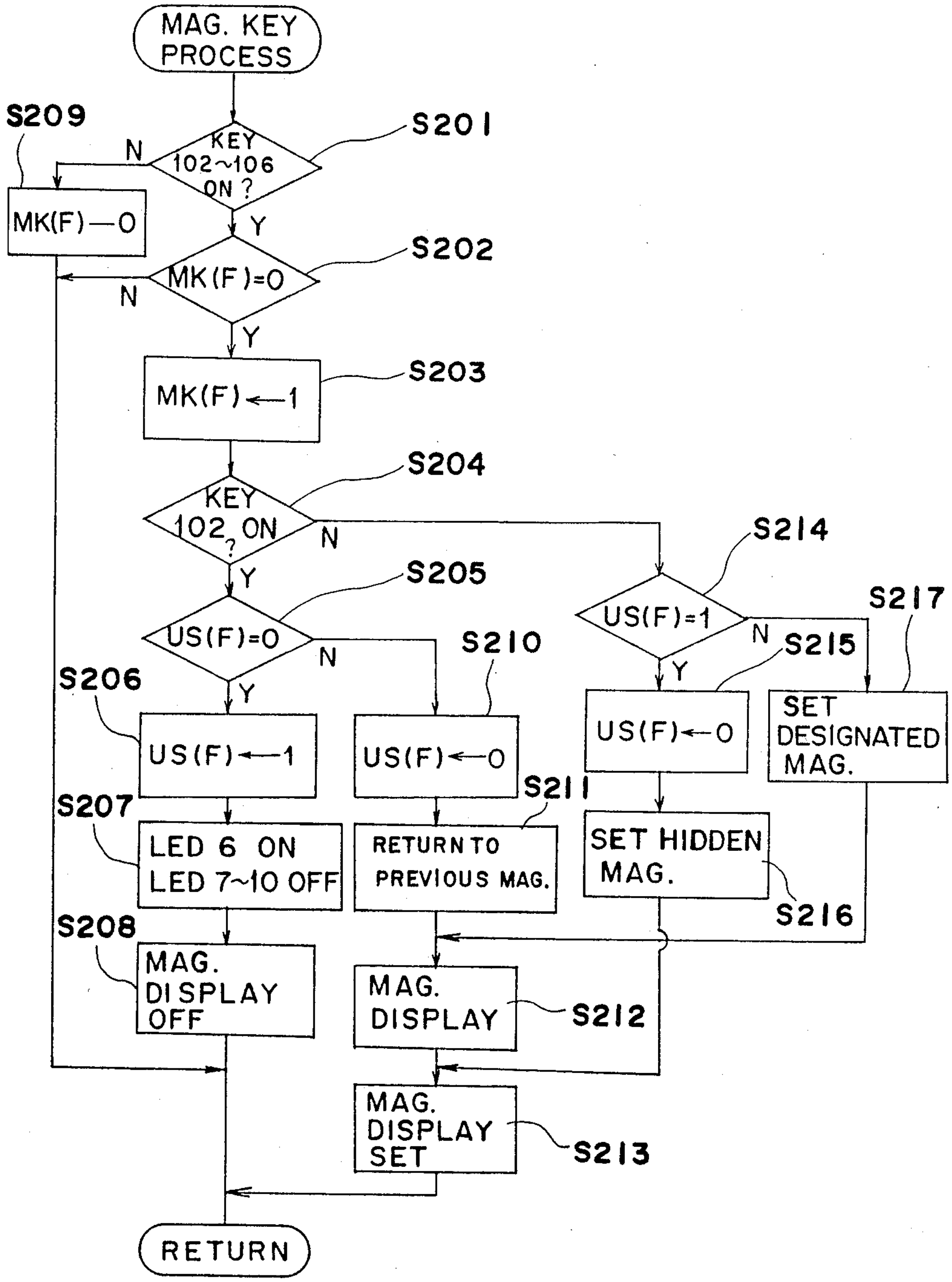

Referring to FIG. 17 showing the detail of the first modification of the magnification setting, wherein depression of any one of the keys 102 through 106 for magnification setting is judged in the step S201. If none of the keys is depressed, MAGNIFICATION flag MK(F) is reset at the step S209. The flag MK(F) shows a state of the one previous routine for detecting the positive going edge of the signal of the keys 102 through 106. If the depression of any one of the keys 102 through 106 is detected in the step S201, the state of MAGNIFICATION flag MK(F) is judged in the step S202. If MK(F) is "1", the input data are not processed since there is no positive going edge of the signal. If the flag MK(F) is "0", the flag MK(F) is set to "1" since there occurs the positive going edge of the keys and the program flow advances to S204 for judging whether or not HIDDEN MAGNIFICATION SETTING key 102 is "1".

When HIDDEN MAGNIFICATION SETTING key 102 is on, HIDDEN MAGNIFICATION SET flag US(F) is judged in the step S205 for judging whether the present mode is HIDDEN MAGNIFICATION SETTING mode. If the flag US(F) is "0", the flag US(F) is set to "1" in the step S206 for enabling HIDDEN MAGNIFICATION SETTING mode with HIDDEN MAGNIFICATION SET indicator 107 turned on, causing the indicators 108 through 111 to be off in the steps S207. Also, MAGNIFICATION indicator 117 is turned off in the step S208 for indicating that none of the magnification ratio is set. Under such state, copy can not be performed, therefore, COPY REQUEST flag is reset to prevent execution of the copy operation.

If "1" state of HIDDEN MAGNIFICATION SET flag US(F) is detected in the step S205, HIDDEN MAGNIFICATION SET mode is disabled by resetting the flag US(F) in the step S210, thereby causing the magnification ratio which was already set just before HIDDEN MAGNIFICATION SET key is depressed to be enabled in the step S211 with the indicator (one of the indicators 108 through 111) lit. Also the magnification ratio is displayed in MAGNIFICATION indicator 117 in the step S213. Such magnification ratio is one of the eight magnification ratios memorized in the memory areas Q1 through Q8.

If it is detected in the step S204 that HIDDEN MAGNIFICATION SET key 102 is not on, whether HIDDEN MAGNIFICATION SETTING mode is set is judged by the state of the flag US(F) in the step S214. If the flag US(F) is "1", the flag US(F) is reset in the step S215, whereby upon depression of any one of the keys 103 through 106, HIDDEN MAGNIFICATION SETTING mode is completed and the magnification ratio selected by any one of the keys 103 through 108 is stored in the RAM in the step S216 and the magnification ratio is displayed in MAGNIFICATION indicator 117 in the step S213. In this time, the indicator 107 is turned on without the indicators 108 through 111 lit so that the fact that HIDDEN MAGNIFICATION is enabled is indicated only by HIDDEN MAGNIFICATION indicator 107. In place of this way of indication, one of the indicators 108 through 111 may be turned on with the HIDDEN MAGNIFICATION indicator 107 so as to indicate which magnification rate is selected.

If it is detected in the step S214 that HIDDEN MAGNIFICATION flag US(F) is "0", the designated magnification ratio selected by the operation of any one of the keys 103 through 106 is set in the memory area Q9 of the RAM in the step S217, any one of the indicators 108 through 111 is turned on in the step S212 and the designated magnification ratio is displayed in MAGNIFICATION indicator 117 in the step S213.

Figure 18:
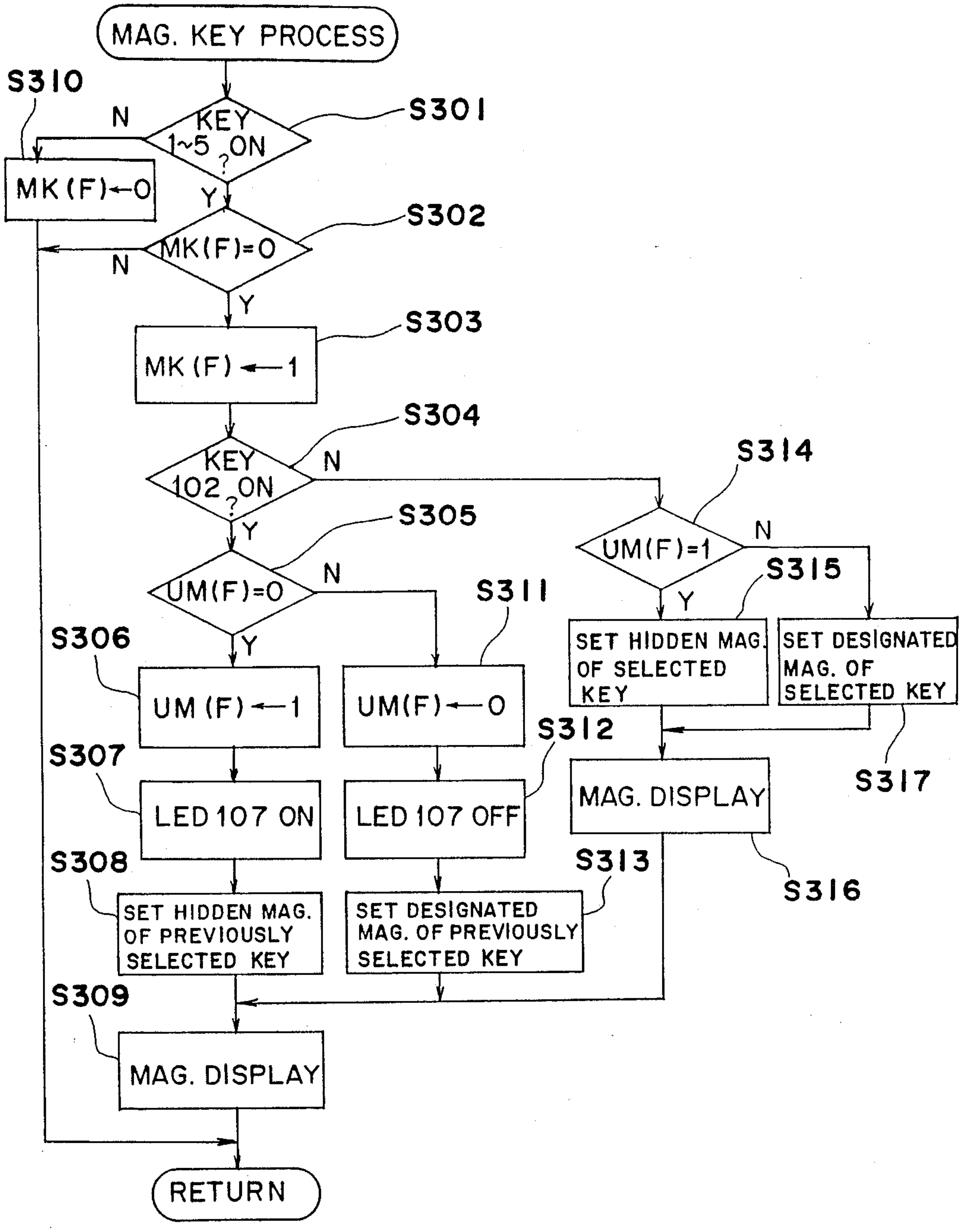

Referring to FIG. 18 showing the operation of the second modification in which the steps S301 through S304 and S310 are similar to those S201 through S204 and S209 in FIG. 17. When HIDDEN MAGNIFICATION SET key 102 is on, HIDDEN MAGNIFICATION flag UM(F) is judged in the step S305. If the flag UM(F) is "0", the flag UM(F) is set to "1" upon depression of HIDDEN MAGNIFICATION SET key 102 in the step S306. The HIDDEN MAGNIFICATION indicator 117 is turned on in the step S307 and in turn. The hidden magnification ratio of one of the keys 103 through 106 which corresponds to the designated magnification ratio previously selected is set in the memory area Q9 of the RAM in the step S308. The hidden magnification ratio thus selected is displayed in the MAGNIFICATION indicator 117 in the step S309. In this case, the state of illumination of any one of the indicators 103 through 108 which was turned on in the past (in the previous DESIGNATED MAGNIFICATION SETTING mode) is kept unchanged.

Upon detecting "1" state of HIDDEN MAGNIFICATION flag UM(F) in the step S305, DESIGNATED MAGNIFICATION SETTING mode is enabled by the operation of the HIDDEN MAGNIFICATION SET key 102 with the flag UM(F) reset in the step S311 and the HIDDEN MAGNIFICATION indicator 107 is turned off in the step S312. Then the designated magnification ratio corresponding to any one of the keys 103 through 106 by which the previous hidden magnification ratio has been set is enabled in the step S313. (The hidden magnification rate was effective in the previous mode and the flag UM(F) was "1".) The designated magnification ratio is displayed in the MAGNIFICATION indicator 117 in the step S309.

If it is detected in the step S304 that HIDDEN MAGNIFICATION SET key 102 is not operated, this means that any one of the keys 103 through 106 is operated. In this case, the flag UM(F) is judged in the step S314. If the flag UM(F) is "1" (this means that HIDDEN MAGNIFICATION mode is enabled.) the hidden magnification ratio corresponding to the operated key is set in the RAM in the step S315. If the flag UM(F) is "0" (this means that DESIGNATED MAGNIFICATION SETTING mode is enabled.), the designated magnification ratio corresponding to the operated key is set in the RAM in the step S317. Then the indicator (any one of 108 to 111) corresponding to the operated key (any one of 103 to 106) is turned on in the step S316 and the designated magnification ratio is displayed in MAGNIFICATION indicator 117 in the step S309.

Figure 19:
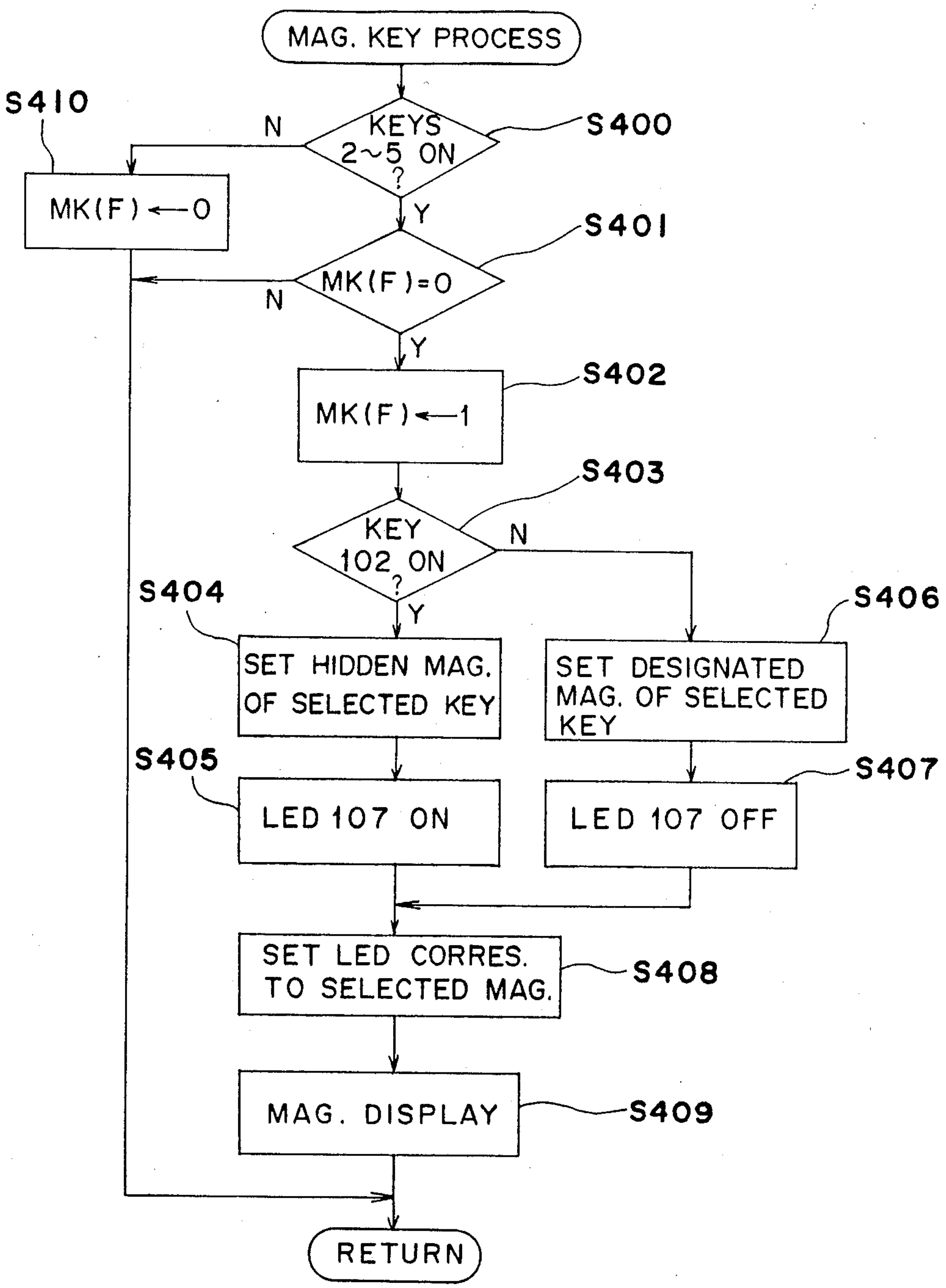

Referring to FIG. 19 showing the third modification, wherein a MAGNIFICATION flag MK(F) is provided for the keys 103 through 106, and it is judged whether the HIDDEN MAGNIFICATION SET key 102 is operated simultaneously with the operation of any one of the keys 103 to 106. In other words, if only HIDDEN MAGNIFICATION SET key 102 is operated, no process is proceeded. When it is detected that a positive going edge of any one of the keys 103 through 106 is present, HIDDEN MAGNIFICATION SET key is judge.

Specifically, when it is detected in the step S400 that any one of the keys 103 through 106 is on, MAGNIFICATION flag MK(F) is judged in the step S401. If the flag MK(F) is "0", the flag MK(F) is set in the step S402, since the positive going edge of the signals from any one of the keys 103 through 106 is present and in turn it is detected in the step 403 that any one of the keys 103 through 106 is operated simultaneous with the operation of HIDDEN MAGNIFICATION SET key 102. In this case, it is possible to operate HIDDEN MAGNIFICATION SET key 102 first and subsequently to operate any one of the keys 103 through 106 so far as the key 102 is kept depressed.

If it is detected in the step S403 that HIDDEN MAGNIFICATION SET key 102 is operated, the hidden magnification ratio corresponding to the operated key is set in the RAM in the step S404. And HIDDEN MAGNIFICATION indicator 107 is turned on in the step S405. Also, any one of the indicators 108 through 111 is turned on in the step S408 and the hidden magnification ratio thus selected is displayed in MAGNIFICATION indicator 117 in the step S409.

If it is detected in the step S403 that any one of the keys 103 through 106 and HIDDEN MAGNIFICATION SET key 102 is not simultaneously operated, the designated magnification ratio selected by any one of the keys 103 through 106 is set in the RAM in the step S406 and subsequently the designated magnification ratio is displayed in MAGNIFICATION indicator 117 with the indicator (any one of 108 through 111) turned off.

If it is detected in the step S400 that none of the keys 103 through 106 is operated, MAGNIFICATION KEY flag MK(F) is reset in the step S410. Accordingly if only HIDDEN MAGNIFICATION SET key 102 is operated, copy can not be made.

Figure 16:
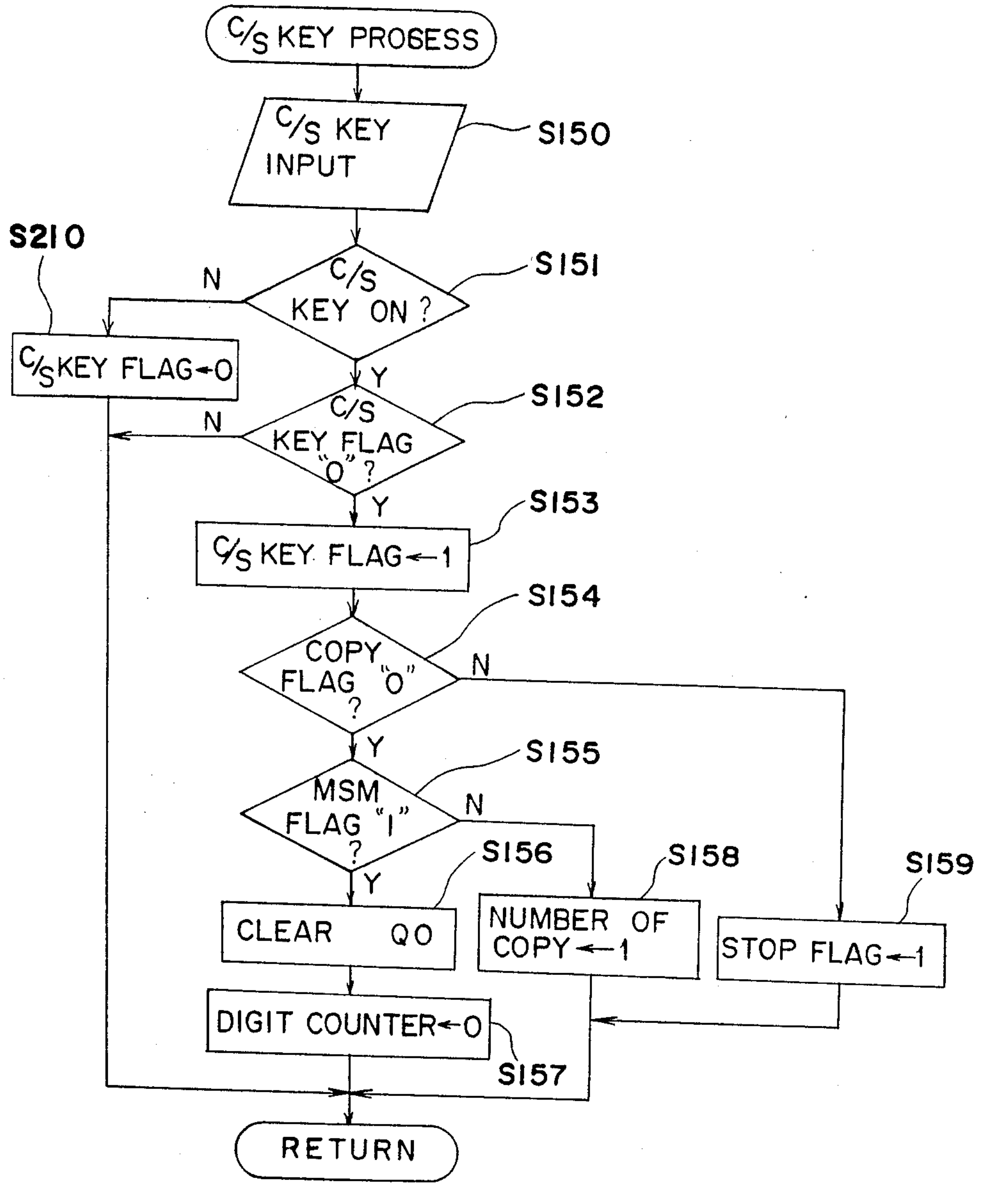

Referring to FIG. 16 showing the procedures of CLEAR/STOP key, the positive going edge of the CLEAR/STOP key is judged in the steps S150 through S153. In case of the presence of the positive going edge in the present routine, COPY flag is judged in the step S154. If COPY flag is "1", STOP flag is set in the step S153 so as to execute STOP routine. If STOP flag is "0" MAGNIFICATION SETTING MODE flag is judged in the step S155. If MAGNIFICATION SETTING MODE flag is "0", the number of copy is cleared and set to "1" in the step S158. If it is judged in the step S155 that MAGNIFICATION SETTING MODE flag is "1", the memory area Q0 is cleared off in the step S156 and the digit counter is cleared in the step S157 so that the magnification data already memorized can be updated.

Figure 20:
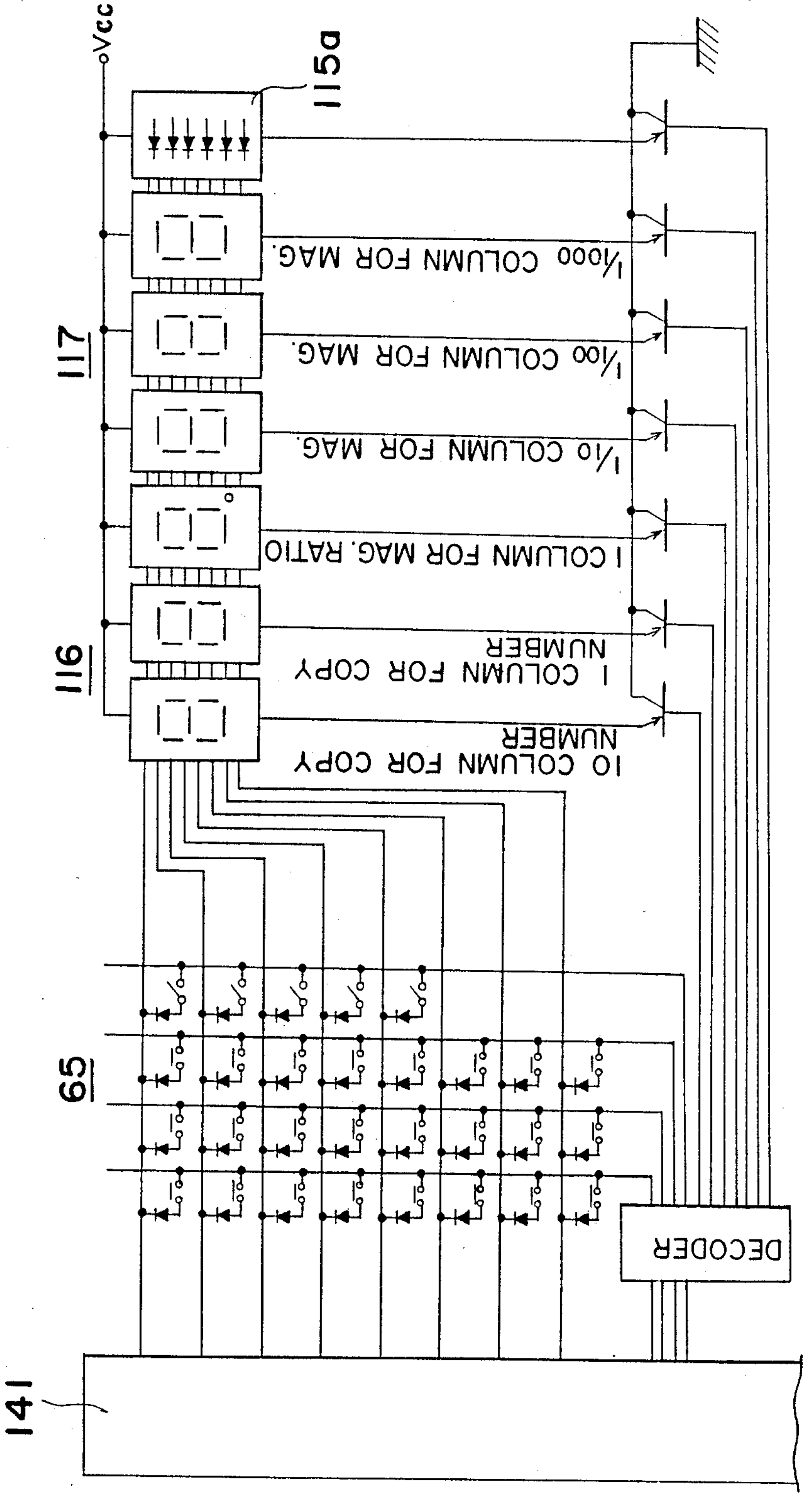
Figure 20B:
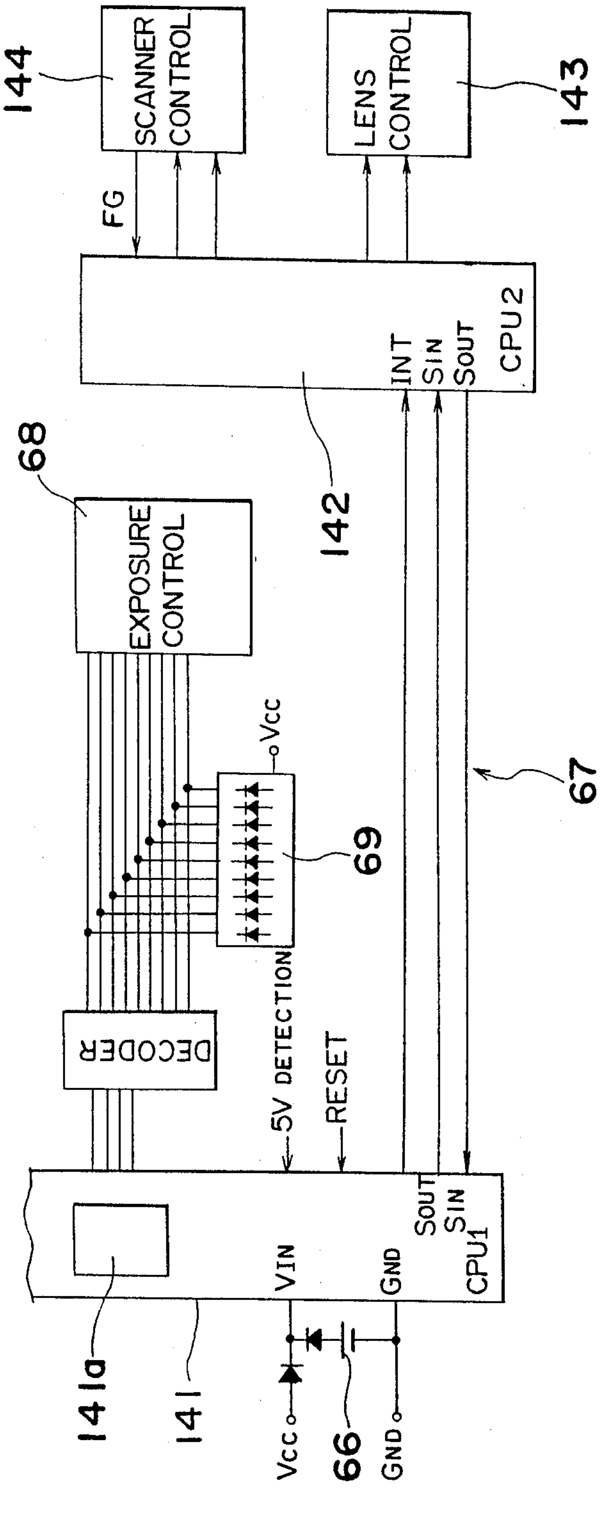
Figure 21A:
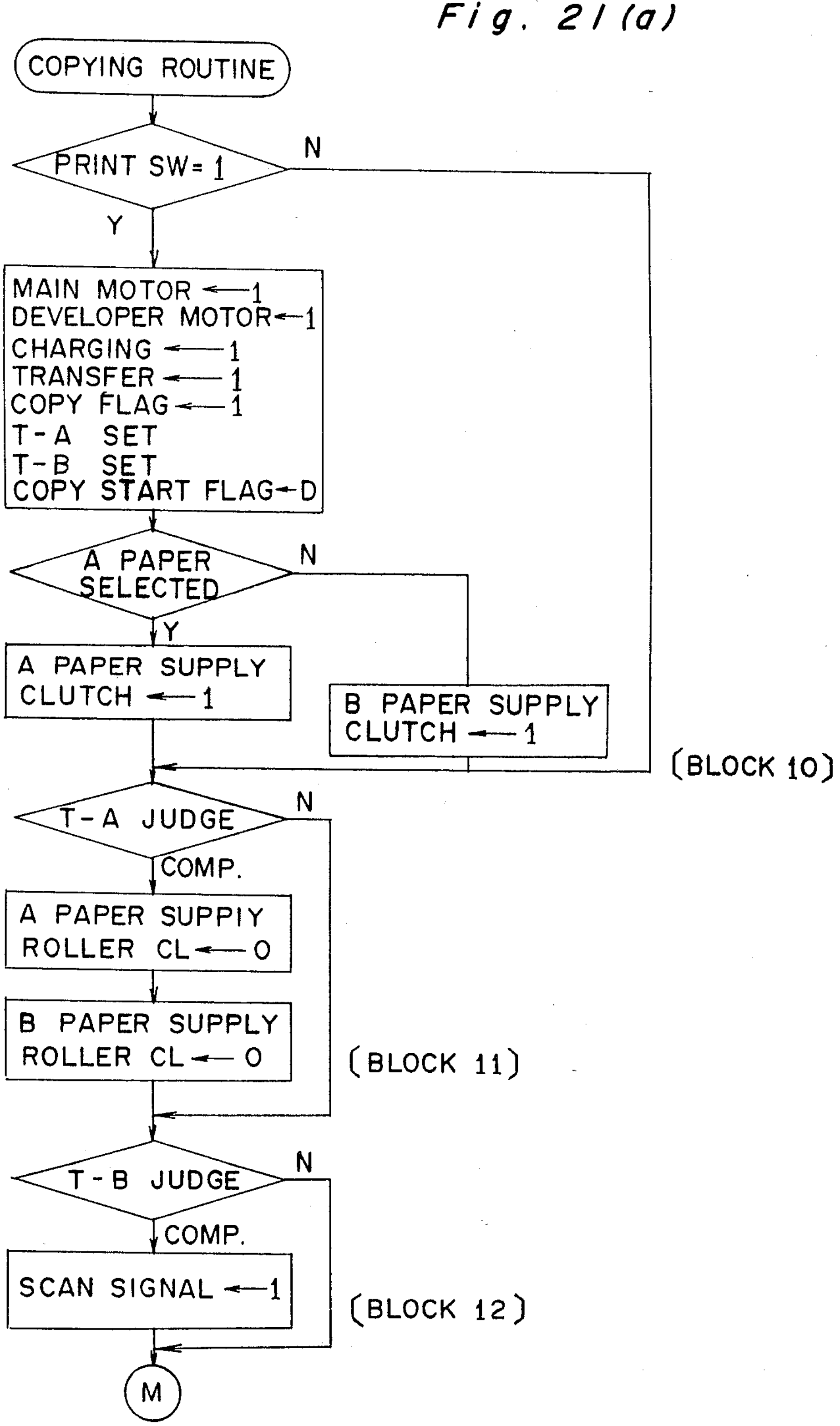
Figure 21:
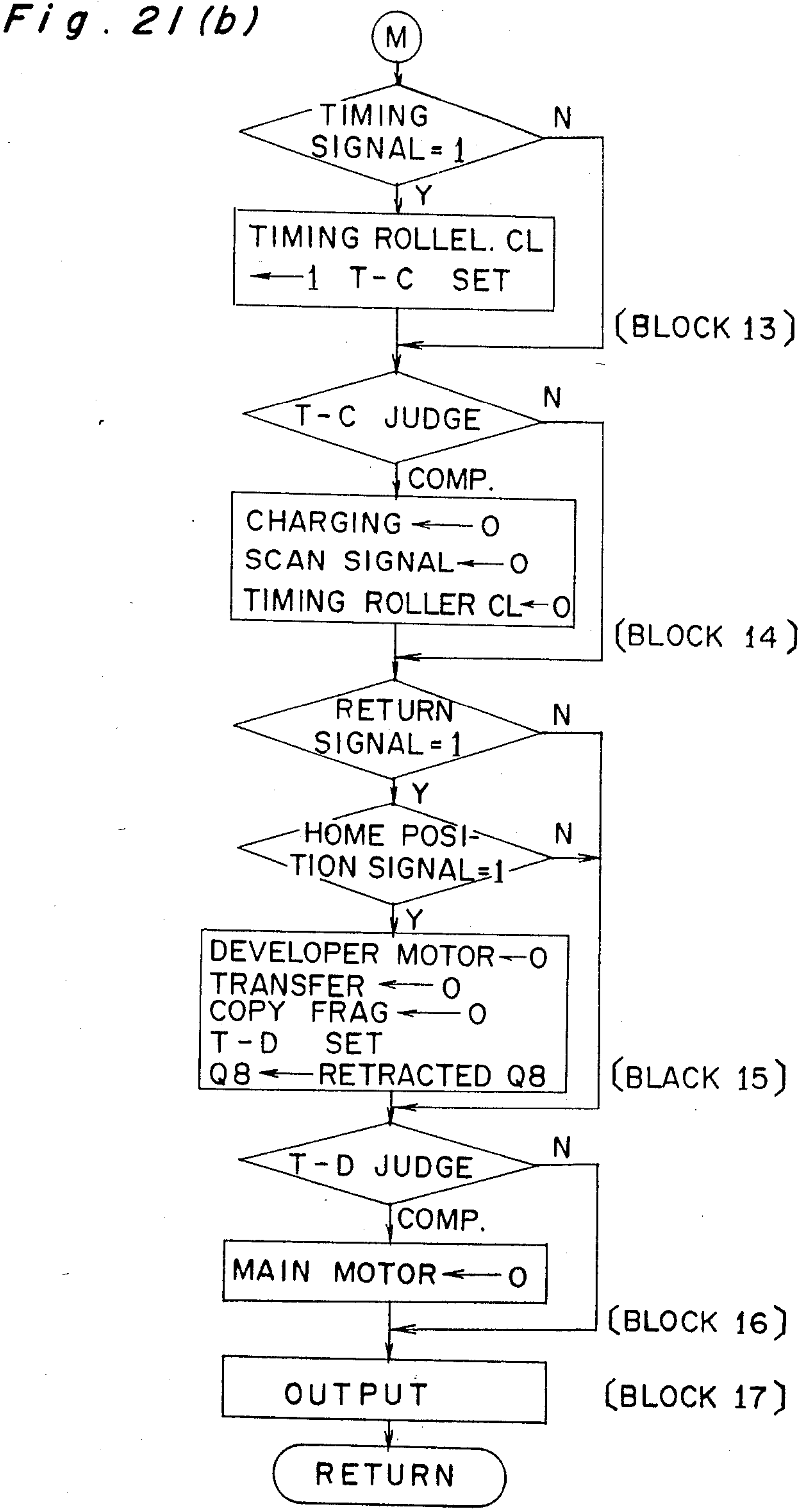
Figure 22:
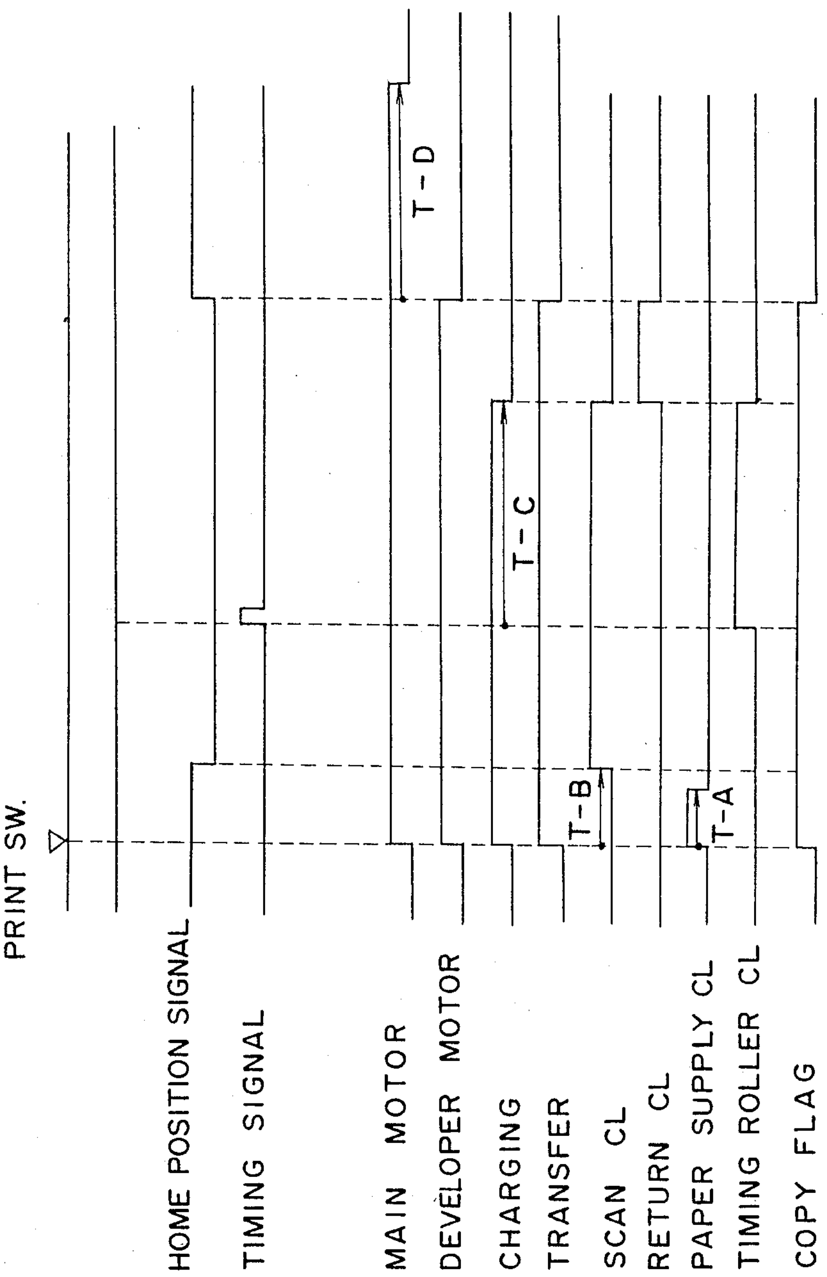
FIG. 22 is a timing chart showing the operation of the various elements of the copying device shown in FIG. 1.

Referring to FIG. 20, a key matrix 65 is formed by the MAGNIFICATION keys 101 through 106, ten keys 118 through 127, PRINT key 130 and various switches provided in the copying machine. The 5 v detection signal becomes high when the power source voltage Vcc is higher than 4.5 volts and low Vcc is lower than 4.5 volts. The CPU 141 monitors the 5 v detection signal and when the 5 v detection signal changes from high to low and executes "stop" instructions so as to be ready in the "stand by" mode. In the "stand by" mode, the CPU 141 is supplied with a power source from a battery 66, thereby preserving the data stored in the RAM. When the power source Vcc is recovered to 5 volts, the "stand by " mode can be released.

The CPU 141 controls either the scanner in the optical system of the copying machine and the motion of the lens in the optical system. For the control above described, various scan timing signals and the magnification rate data are transferred from the CPU 141 to the CPU 142 through an interface 67 of a serial type. Also, paper feeding timing signals and other signals are transferred from the CPU 142 to CPU 141 through the interface 67.

Light emitting diodes 115*a* are used for displaying various fault conditions such as paper jam. The CPU 141 controls the exposure value control device 68 for controlling light value of the chargers 3 and 5. An exposure value indicator 69 is connected to the exposure control circuit 68.

FIG. 15, comprised of FIGS. 15(*a*) and 15(*b*), illustrates a flow chart showing the sequence of control of the copying operation of the copying machine. The flow chart will now be described, referring also to FIG. 16 showing a time chart.

In block 10, when print switch SW is depressed, a main motor M1, the developer motor M2, the charger 12 and the transfer charger 14 are rendered on and, if the upper or lower paper supply is selected, an upper or lower paper supply roller clutch, respectively is rendered on. Thereafter, the copy flag is rendered "1" and, then T-A (timer-A) and T-B (timer B) are set. In subsequent block 11, T-A is judged, and if it is the timing at which T-A is terminated, the paper supply roller clutches are turned off. In block 12, T-B is judged, and if it is the timing at which T-B is terminated, the scan signal is rendered on so as to drive the scan motor M3 to start scanning of the optical system. In block 13, when the timing signal becomes "1", timing roller clutch CL3 is turned on and a T-C is set.

In block 14, at the timing of termination of T-C, the charging, scan signal and timing roller clutch CL3 are turned off. The length of time set in the timer T-C may be varied corresponding to the size of the paper used. In block 15, when a return signal is "1", that is, when a home position SW is turned on upon the return of a scanner that has once left the home position, the developer motor M2 and the transfer charger 14 are rendered off, a copy flag is rendered "0", and a T-D is set. In block 16, at the timing of termination of T-D, the main motor M1 is turned off. In subsequent block 17, the result of the process which has taken place is outputted.

The timers T-A through T-D are respectively digital timers arranged to increase the counted value each time the main routine set in the CPU is executed and the contents of timers T-A through T-D are memorized in the CPU.

What is claimed is:

1. A magnification control device for use in a copying machine which comprises numeric data input means first data storing means for storing the data entered by the data input means, second data storing means for storing a plurality of copy magnification ratios, selecting means for selecting one of the copying magnification ratios from the second data storing means, third data storing means for storing magnification ratio data for a copy, operating means for executing the copy in said copying machine, and control means for causing the data entered by the data input means or the data selected by the selecting means to be stored in said third data storing means upon operation of said operating means under such states that the data is selected by the selecting means or the data is stored in the first data storing means.

2. The control device according to claim 1, wherein said control means further comprises means for setting a control mode for setting at least one magnification ratio in the control means and mode setting means for setting the control means in said magnification setting mode, whereby said first data storing means is allowed to store the data entered by said data input means only when the control means is set in said magnification setting mode.

3. The control device according to claim 2, wherein the data entered by the data input means can be stored in said second data storing means when the selecting means is operated under such a state that the data from the data input means are present in the magnification setting mode.

4. The control device according to claim 1, wherein said second data storing means are so arranged as to store designated magnification ratios and hidden magnification ratios and said data selecting means comprises first key for selecting the designated magnification or hidden magnification and second keys for selecting magnification ratios, whereby any one of the hidden magnification ratios can be selected by operation of any one of the second keys following the operation of the first key.

5. The control device according to claim 1, wherein said second data storing means are so arranged as to store designated magnification ratios and hidden magnification ratios and said data selecting means comprises a first key for selecting the designated magnification or hidden magnification and second keys for selecting magnification ratios, whereby any one of the hidden magnification ratios corresponding to any one of the second keys which was already operated in the past can be selected upon new operation of the first key.

6. The control device according to claim 1, wherein said second data storing means are so arranged as to store designated magnification ratios and hidden magnification ratios and said data selecting means comprises a first key for selecting the designated magnification or hidden magnification and second keys for selecting magnification ratios, whereby any one of the hidden magnification ratios can be selected only by simultaneous operation of the first key and any one of the second keys.

7. A magnification control device for use in a copying machine which comprises storing means for storing a first group of a plurality of magnification ratios and a second group of a plurality of magnification ratios separatedly, group selecting means manually operable for selecting any one of the groups, magnification ratio selecting means provided common to said two groups for selecting any one of the magnification ratio out of the groups, and control means for controlling the copying machine in such a manner that any one of the magnification ratios can be selected from said storing means in response to the selecting operation of said group selecting means and the magnification ratio selecting means and a copy or copies can be made with a magnification ratio thus selected.

* * * * *